(12) United States Patent
Chang et al.

(10) Patent No.: US 11,409,062 B2
(45) Date of Patent: Aug. 9, 2022

(54) OPTICAL TRANSCEIVER MODULE AND OPTICAL CABLE MODULE

(71) Applicant: uSenlight Corporation, Hsinchu (TW)

(72) Inventors: Chun-Yang Chang, Hsinchu (TW); Yun-Cheng Huang, Hsinchu (TW); Wen-Hsien Li, Hsinchu (TW); Cheng-Hung Lu, Hsinchu (TW); Ming-Ju Chen, Hsinchu (TW); Chang-Cherng Wu, Hsinchu (TW)

(73) Assignee: USENLIGHT CORPORATION, Hsinchu (TW)

( * ) Notice: Subject to any disclaimer, the term of this patent is extended or adjusted under 35 U.S.C. 154(b) by 0 days.

(21) Appl. No.: 17/171,571

(22) Filed: Feb. 9, 2021

(65) Prior Publication Data

US 2021/0165177 A1 Jun. 3, 2021

Related U.S. Application Data

(63) Continuation-in-part of application No. 16/811,334, filed on Mar. 6, 2020, now Pat. No. 11,105,990.

(30) Foreign Application Priority Data

Mar. 18, 2019 (CN) .......................... 201910202532.6
Oct. 31, 2019 (CN) .......................... 201911053739.8
Feb. 21, 2020 (CN) .......................... 202010106520.6

(51) Int. Cl.
*G02B 6/42* (2006.01)
*H04B 10/25* (2013.01)
*H04B 10/40* (2013.01)

(52) U.S. Cl.
CPC .......... *G02B 6/4257* (2013.01); *G02B 6/4246* (2013.01); *H04B 10/25* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 7,215,885 B2 * | 5/2007 | Yamane | ............ | G02B 6/29362 385/31 |
| 7,703,992 B2 * | 4/2010 | Pfnuer | ................ | G02B 6/4292 385/92 |
| 7,853,104 B2 * | 12/2010 | Oota | .................... | G02B 6/4206 385/47 |
| 8,340,522 B2 * | 12/2012 | Yu | ........................ | G02B 6/2706 398/85 |
| 8,899,846 B2 * | 12/2014 | Luo | ....................... | G02B 6/4246 385/88 |
| 9,419,717 B2 * | 8/2016 | Huang | ................. | H04B 10/506 |
| 9,817,196 B2 * | 11/2017 | Ho | ......................... | H04B 10/60 |

(Continued)

*Primary Examiner* — Jerry Rahll
(74) *Attorney, Agent, or Firm* — WPAT, PC

(57) ABSTRACT

Provided is an optical transceiver module, comprising a housing, a substrate, an optical receiving device and a plurality of optical transmitting devices. The substrate is disposed in the housing. The optical receiving device is disposed on the substrate. The plurality of optical transmitting devices are connected to the substrate, and the optical transmitting devices are arranged in an alternating manner. The optical transceiver module effectively utilizes the internal space thereof for a compact design and can have a simple structure for manufacturing.

19 Claims, 18 Drawing Sheets

(56) References Cited

U.S. PATENT DOCUMENTS

| | | | |
|---|---|---|---|
| 9,977,201 B2* | 5/2018 | Enya | F21S 41/147 |
| 9,995,892 B2* | 6/2018 | Xu | G02B 6/34 |
| 10,025,049 B2* | 7/2018 | Eichler-Neumann | G02B 6/4257 |
| 10,191,233 B2* | 1/2019 | Lin | G02B 6/4224 |
| 10,241,286 B2* | 3/2019 | Jung | G02B 6/4271 |
| 10,551,569 B2* | 2/2020 | Gui | G02B 6/29365 |
| 10,564,101 B1* | 2/2020 | Neron | G02B 6/3839 |
| 10,698,168 B1* | 6/2020 | Lin | H01S 5/023 |
| 10,761,278 B2* | 9/2020 | Jiang | H05K 3/3405 |
| 11,146,039 B2* | 10/2021 | Lin | H01S 5/0233 |
| 2003/0190126 A1* | 10/2003 | Toyoshima | G02B 6/2938 385/120 |
| 2004/0028350 A1* | 2/2004 | Gerdom | G02B 6/4228 385/88 |
| 2008/0175591 A1* | 7/2008 | Yu | G02B 6/4246 398/65 |
| 2010/0172614 A1* | 7/2010 | Oota | G02B 6/4208 385/45 |
| 2012/0099870 A1* | 4/2012 | Luo | G02B 6/4246 398/135 |
| 2013/0251316 A1* | 9/2013 | Okada | G02B 6/4204 385/93 |
| 2015/0256259 A1* | 9/2015 | Huang | H04B 10/40 398/88 |
| 2016/0231521 A1* | 8/2016 | Smith | G02B 6/4246 |
| 2017/0059394 A1* | 3/2017 | Ho | G02B 6/4284 |
| 2017/0075079 A1* | 3/2017 | Lin | G02B 6/4246 |
| 2017/0212317 A1* | 7/2017 | Eichler-Neumann | G02B 6/4257 |
| 2017/0351044 A1* | 12/2017 | Xu | G02B 6/4214 |
| 2018/0003908 A1* | 1/2018 | Jung | H04B 10/564 |
| 2018/0017746 A1* | 1/2018 | Enya | F21S 41/147 |
| 2018/0284369 A1* | 10/2018 | Lin | G02B 6/4224 |
| 2019/0285816 A1* | 9/2019 | Jiang | H05K 3/3405 |
| 2020/0251879 A1* | 8/2020 | Lin | H04B 10/506 |
| 2020/0301083 A1* | 9/2020 | Chang | G02B 6/4246 |
| 2020/0373737 A1* | 11/2020 | Lin | G02B 6/4296 |
| 2021/0165176 A1* | 6/2021 | Chang | G02B 6/4257 |
| 2021/0165177 A1* | 6/2021 | Chang | H04B 10/40 |
| 2021/0333496 A1* | 10/2021 | Chang | G02B 6/4271 |

\* cited by examiner

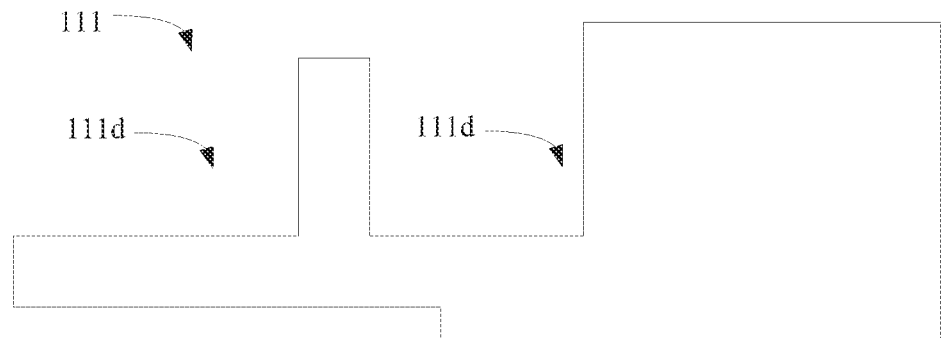
FIG. 17
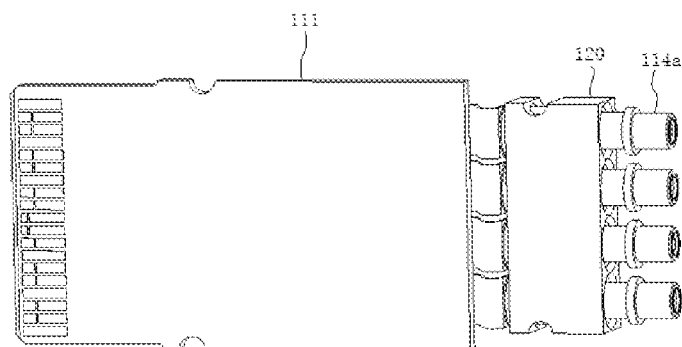
FIG. 18
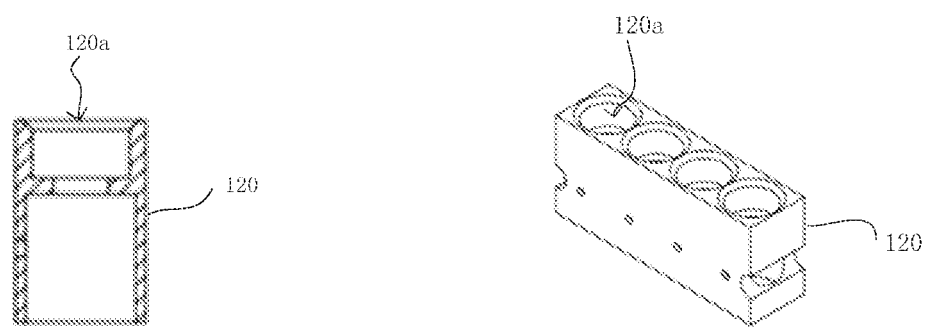
FIG. 19AFIG. 19B

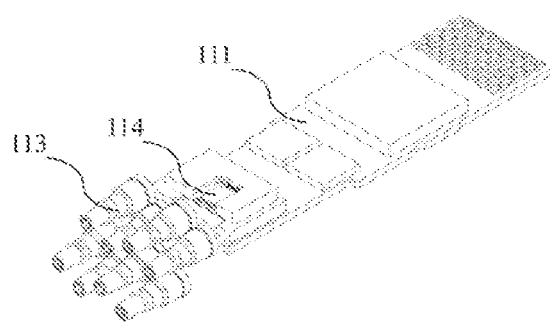
FIG. 37A
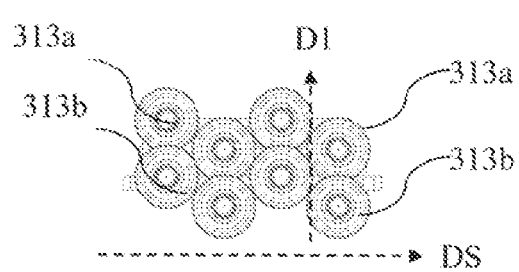
FIG. 37B
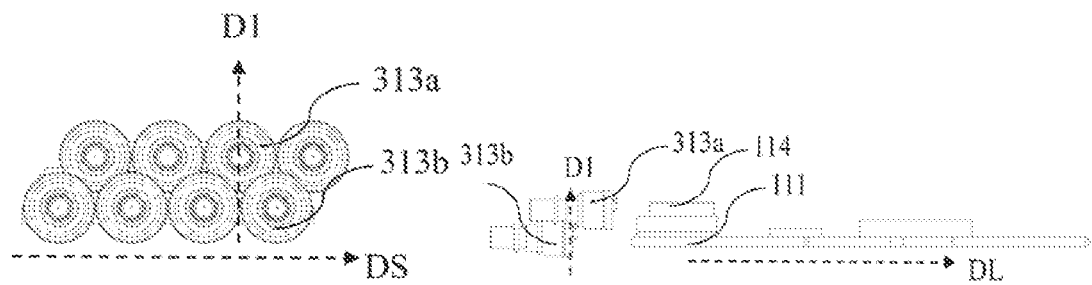
FIG. 38
FIG. 39

OPTICAL TRANSCEIVER MODULE AND OPTICAL CABLE MODULE

FIELD OF THE INVENTION

The present invention relates to an optical fiber communication technology field, and in particularly, to an optical transceiver module and an optical fiber cable module using the same.

BACKGROUND OF THE INVENTION

In the optical fiber communication technology, it is necessary to convert electrical signals into optical signals through an optical transceiver module (such as a laser device), and then to couple the optical signals into an optical fiber for transmitting. At present, the demand for computing devices continues to rise, even as the demand for computing devices to achieve higher performance also rises. However, conventional electrical I/O (input/output) signaling is not expected to keep pace with the demand for performance increases, especially for a higher performance computing expectations. Currently, I/O signals are sent electrically to and from the processor through the board and out to peripheral devices. Electrical signals must pass through solder joints, cables, and other electrical conductors. Therefore, electrical I/O signal rates are limited by the electrical characteristics of the electrical connectors.

The optical fiber transmission system replaces the traditional communication transmission system gradually. The optical fiber transmission system does not have bandwidth limitation, and also has advantages of a high-speed transmission, long transmission distance, its material not interfered by the electromagnetic wave. Therefore, the present electronic industrial performs research toward optical fiber transmission which will become the mainstream in the future.

However, in recent years, the optical modules such as optical transceiver are required to be further down-sized. Therefore, the structure of the optical fiber transmission system is required to be optimized.

SUMMARY OF THE INVENTION

An object of the present invention is to provide an optical transceiver module comprising a housing, a substrate, an optical receiving device and a plurality of optical transmitting devices. The substrate is disposed in the housing. The optical receiving device is disposed on the substrate. The plurality of optical transmitting devices are connected to the substrate, and the optical transmitting devices are arranged in an alternating manner.

Another object of the present invention is to provide an optical cable module comprising an optical fiber cable, and an optical transceiver module comprising a housing, a substrate, at least one optical receiving device and a plurality of optical transmitting devices. The substrate is disposed in the housing. The optical receiving device is disposed on the substrate. The plurality of optical transmitting devices connected to the substrate, and the optical transmitting devices are arranged in an alternating manner.

The present invention provides an optical transceiver module effectively utilizing the internal space thereof for a compact design. Moreover, the optical transceiver module of the invention can have a simple structure for manufacturing.

The structure and the technical means adopted by the present invention to achieve the above-mentioned and other objects can be best understood by referring to the following detailed description of the preferred embodiments and the accompanying drawings:

DESCRIPTION OF THE DRAWINGS

FIGS. 15 to 17 are schematic diagrams showing the substrate in different embodiments of the present invention.

FIG. 18 is a schematic diagram showing the optical receiving device and the substrate according to one embodiment of the present invention.

FIG. 19A and FIG. 19B are schematic diagrams showing the optical receiving holder according to one embodiment of the present invention.

FIGS. 32A to 39 are schematic diagrams showing the transmitting devices in different embodiments of the present invention.

DETAILED DESCRIPTION OF THE PREFERRED EMBODIMENTS

Figure 1:
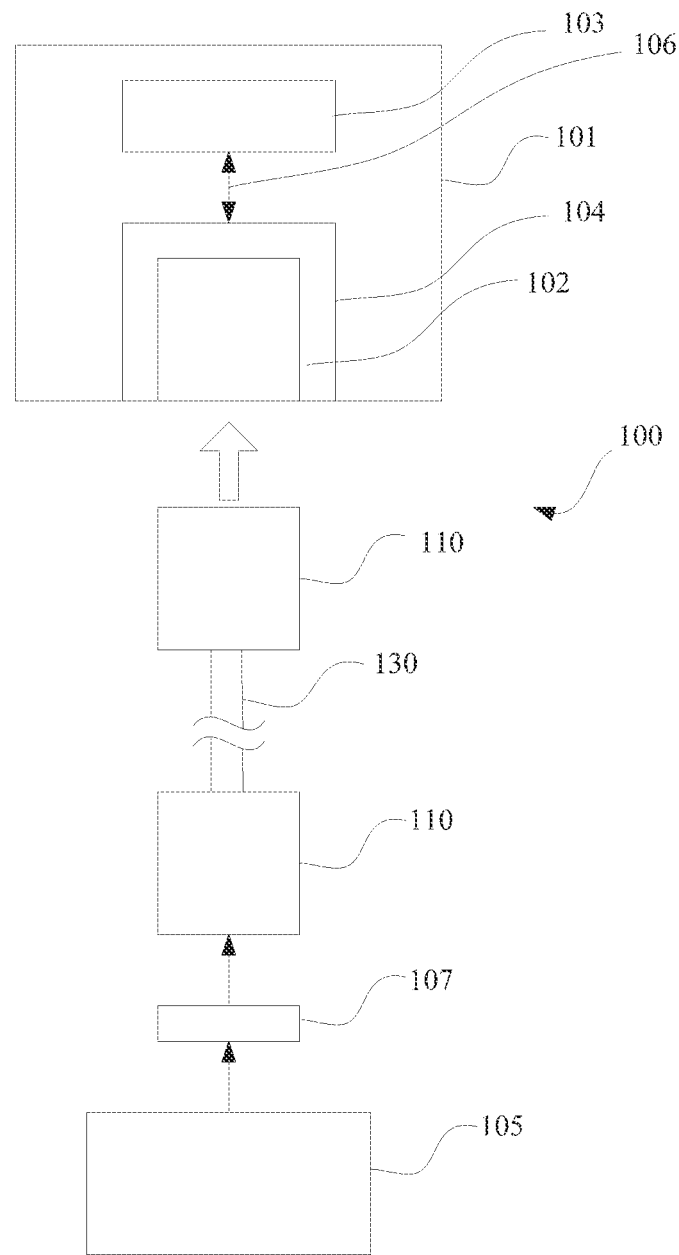
FIG. 1 is a block diagram showing a system using the optical cable module according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings allow ease of understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It should be understood that, when an element such as a layer, film, region, or substrate is referred to as being "on" another element, it can be directly on the other element or intervening elements can also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top with respect to the direction of gravitational pull.

FIG. 1 is a block diagram showing a system using the optical cable module 100 according to one embodiment of the present invention. The optical cable module 100 comprises at least one optical transceiver module 110, at least one optical cable 130, and at least one electronic device 101. The electronic device 101 can be any number of computing devices, including, but not limited to, a desktop or laptop computer, a notebook, a tablet, a net book, an ultra book, or other such computing devices. Besides computing devices, it should be understood that many other types of electronic devices can incorporate one or more of the types of the optical transceiver module 110 and/or mating port 102 herein, and the embodiments described herein would apply equally well in such electronic devices. Examples of other such electronic devices can include handheld devices, smartphones, media devices, ultra-mobile personal computers, personal digital assistants (PDA), mobile phones, multimedia devices, memory devices, cameras, voice recorders, I/O devices, servers, set-top boxes, printers, scanners, monitors, televisions, electronic billboards, projectors, entertainment control units, portable music players, digital video recorders, networking devices, gaming devices, gaming consoles, or any other electronic device that might include such the optical transceiver module 110 and/or mating port 102. In some embodiments, the electronic device 101 can be any other electronic device processing data or images.

Referring to FIG. 1 again, the optical cable 130 is connected to the optical transceiver module 110 for transmitting optical signals. The optical cable 130 can include at least one optical fiber, and the optical signals are transmitted within the optical fiber.

Referring to FIG. 1 again, the electronic device 101 can comprise a processor 103, and the processor 103 can be any processing component that processes electrical and/or optical I/O signals. It should be understood that a single processing device could be used, or multiple separate devices can be used. The processor 103 can include or be a microprocessor, programmable logic device or array, microcontroller, signal processor, or any combination thereof. Furthermore, the processor 103 can include any type of processing unit, such as, for example, CPU, multi-processing unit, a reduced instruction set computer (RISC), a processor that has a pipeline, a complex instruction set computer (CISC), digital signal processor (DSP), and the like.

Referring to FIG. 1 again, the mating port 102 of the electronic device 101 is configured to interface with the optical transceiver module 110 of the optical cable module 100. The optical transceiver module 110 is configured to allow a peripheral device 105 to interconnect with the electronic device 101. The optical transceiver module 110 can support communication via an optical interface. In varied embodiments, the optical transceiver module 110 can also support communication via an electrical interface.

Referring to FIG. 1 again, the peripheral device 105 can be a peripheral I/O device. In varied embodiments, the peripheral device 105 can be one or more than one computing devices, including, but not limited to, a desktop or laptop computer, a notebook, an Ultra book, a tablet, a net book, or other such computing devices. Besides computing devices, it should be understood that the peripheral device 105 can include handheld devices, smart phones, media devices, personal digital assistants (PDA), ultra-mobile personal computers, mobile phones, multimedia devices, memory devices, cameras, voice recorders, I/O devices, servers, set-top boxes, printers, scanners, monitors, televisions, electronic billboards, projectors, entertainment control units, portable music players, digital video recorders, networking devices, gaming devices, gaming consoles, or any other electronic device.

Referring to FIG. 1 again, in one embodiment, the electronic device 101 can include an internal optical path, and the optical path can represent one or more components, which can include processing and/or termination components that convey an optical signal between processor 103 and port 102. Conveying a signal can include the generation and converting to optical, or the receiving and converting to electrical, as described in more detail below. In an embodiment where electrical interfacing from port 102 is supported in device 101, device 101 can also include an electrical path, and the electrical path represents one or more components that convey an electrical signal between processor 103 and port 102.

Referring to FIG. 1 again, the optical transceiver module 110 of the present invention is configured to mate with the mating port 102 of the electronic device 101. As used herein, mating one connector with another can refer to providing a mechanical connection. The mating of one connector with another typically also provides a communication connection. The mating port 102 can include a housing 104, which can provide the mechanical connecting mechanisms. The mating port 102 can also include one or more optical interface components. A path 106 can represent one or more components, which can include processing and/or termination components that convey an optical signal (or an optical signal and an electrical signal) between the processor 103 and the port 102. Conveying a signal can include the generation and conversion to optical, or the receiving and conversion to electrical.

Referring to FIG. 1 again, the optical transceiver module 110 of the present invention can be referred to as an active optical connector or active optical receptacle and active optical plug. In general, such active optical connectors can be configured to provide the physical connecting interface to a mating connector and an optical assembly. The optical transceiver module 110 can be a light engine configured to generate and/or process the optical signals. The optical transceiver module 110 can provide conversion from an electrical-to-optical signal or from an optical-to-electrical signal.

In some embodiments, the optical transceiver module 110 can be configured to process the optical signals consistent with or in accordance with one or more communication protocols. For embodiments in which the optical transceiver module 110 is configured to convey an optical signal and an electrical signal, it is not strictly necessary for the optical and electrical interfaces to operate according to the same protocol, but they can. Whether the optical transceiver module 110 processes signals are in accordance with the protocol of the electrical I/O interface, or in accordance with a different protocol or standard, the optical transceiver module 110 can be configured or programmed for an intended protocol within a particular connector, and different light engines can be configured for different protocols.

Figure 2:
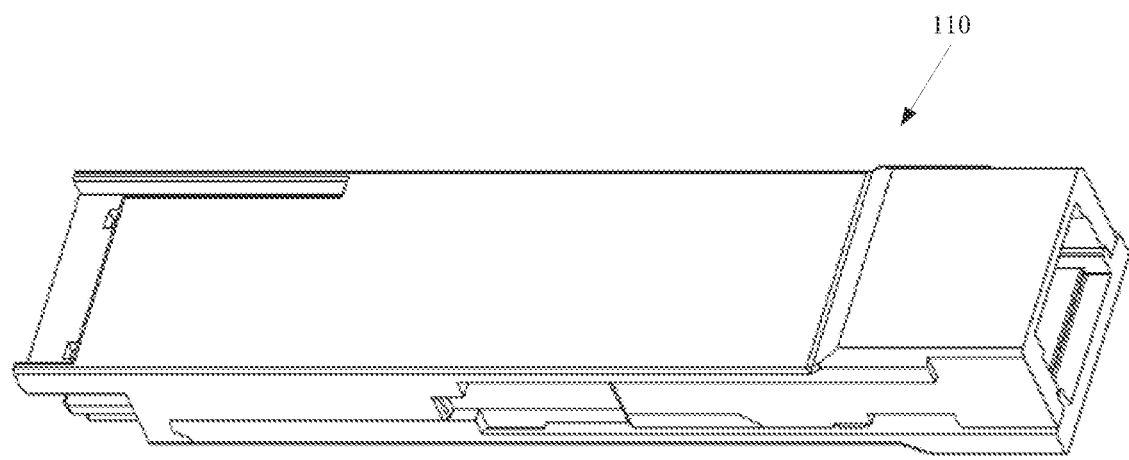
FIGS. 2 to 4 are schematic diagrams showing the optical transceiver module according to one embodiment of the present invention.
Figure 3:
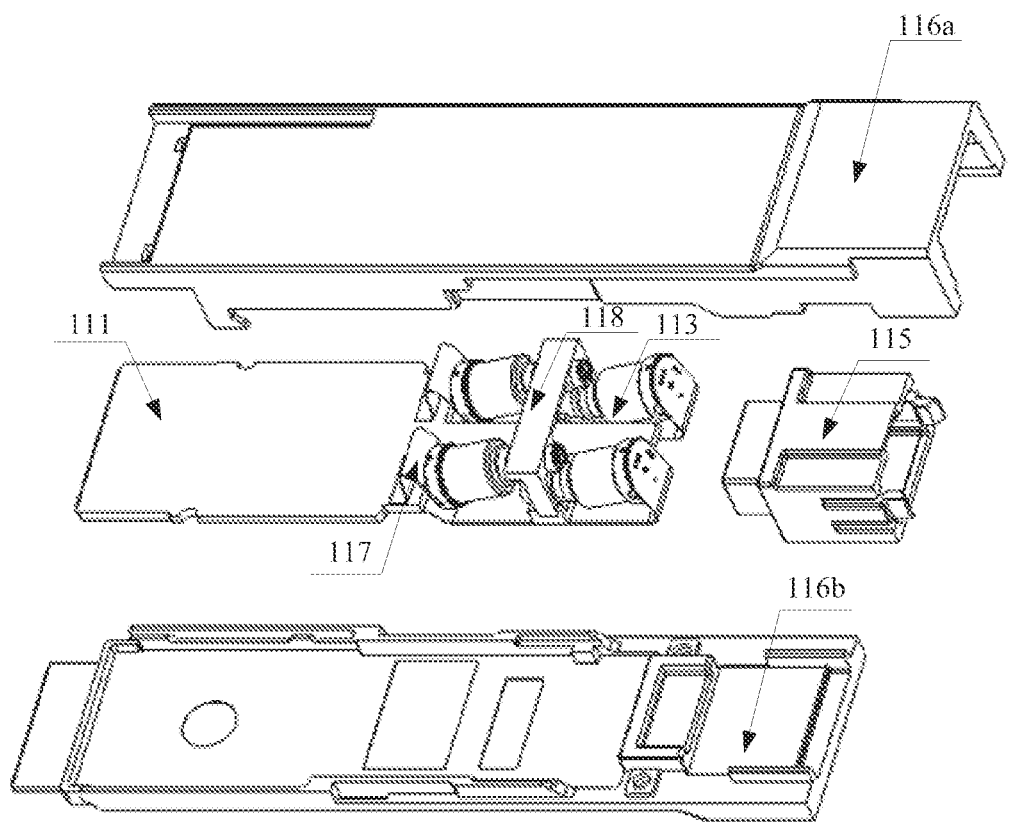
Figure 4:
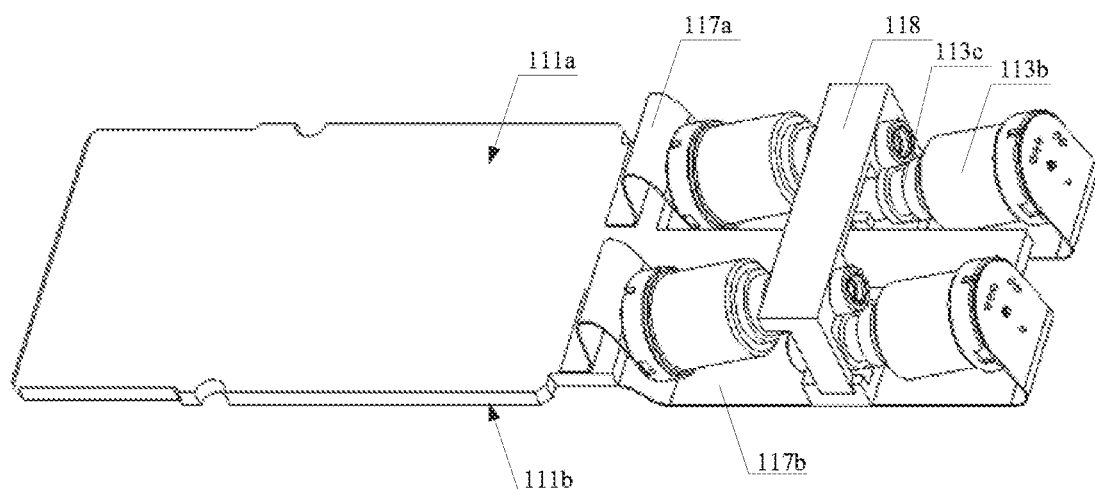

FIGS. 2 to 4 are schematic diagrams showing the optical transceiver module according to embodiments of the present invention. The optical transceiver module 110 can comprise a substrate 111, a processor 112, a plurality of optical transmitting devices 113, at least one optical receiving device 114, a coupler 115, a housing 116, a connecting board 117 and an optical transmitting holder 118. The substrate 111 has a first surface 111a and a second surface 111b opposite thereto. The substrate 111 may be a printed circuit board (PCB) or a ceramic substrate including mechanisms, such as pins or connecting balls, for interfacing the system to an external device. The processor 112 is connected to the substrate 111, and the processor 112 is intended to show any type of processor, and not limited to any particular processor type. The optical transmitting devices 113 and the at least one optical receiving device 114 are electrically connected to the processor 112 on the substrate 111, such as through traces processed into the package substrate 111, for transmitting and receiving optical signals. The optical transmitting devices 113 and the at least one optical receiving device 114 can comprise a receiving circuit for transferring an electrical signal, and more specifically process the timing or other protocol aspects of electrical signals corresponding to an optical signal. The housing 116 can have an internal space for accommodating the substrate 111, the processor 112, the optical transmitting device 113, the optical receiving device 114, the connector 115, the connecting board 117 and the optical transmitting holder 118. The connecting board 117 is connected between the substrate 111 and the optical transmitting devices 113, and the optical transmitting holder 118 can be used to position and arrange the optical transmitting devices 113, so as to ensure the characteristic loss and reliability of the engagement between fiber channels and the optical transceiver assembly.

Referring to FIGS. 4 to 9, the substrate 111 is disposed in the housing 116, and the substrate 111 can comprise at least one convex portion 111c and at least one recess portion 111d. The at least one convex portion 111c protrudes to the substrate 111, and the at least one recess portion 111d is formed and positioned to at least one side of the convex portion 111c. The optical transmitting devices 113 are allowed to be arranged in the at least one recess portion 111d. That is, the optical transmitting devices 113 can be positioned to at least one side of the convex portion 111c. It is worth noting that the circuits or at least one IC chip can be disposed on a surface of the at least one convex portion 111c of the substrate 111, so as to increase the setting area for the circuits.

Figure 5A:
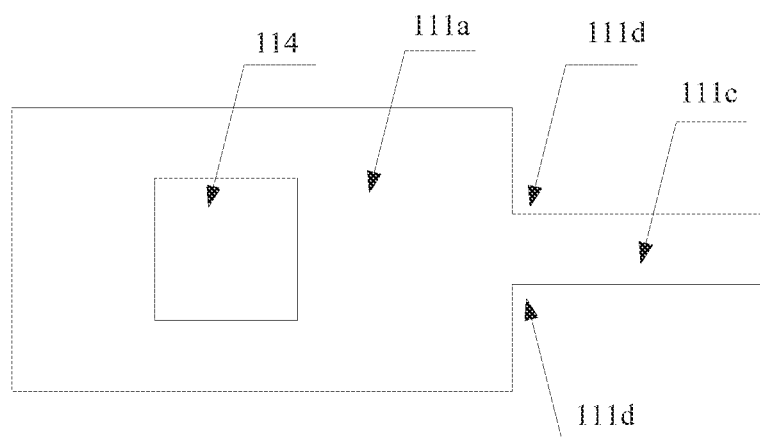
FIGS. 5A to 9 are schematic diagrams showing the substrate in different embodiments of the present invention.
Figure 5B:
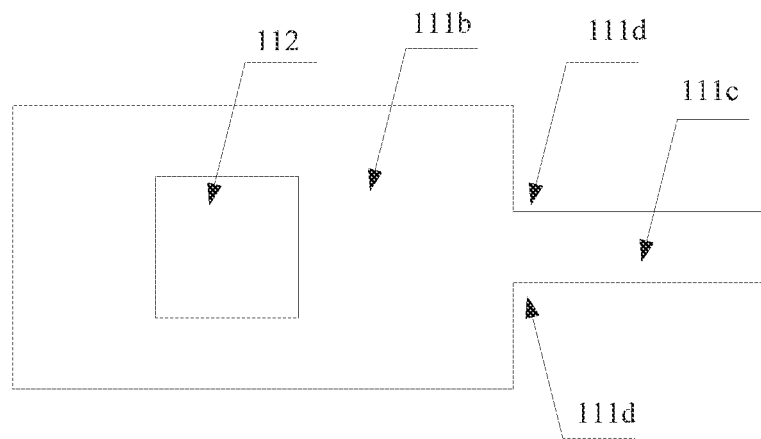
Figure 6:
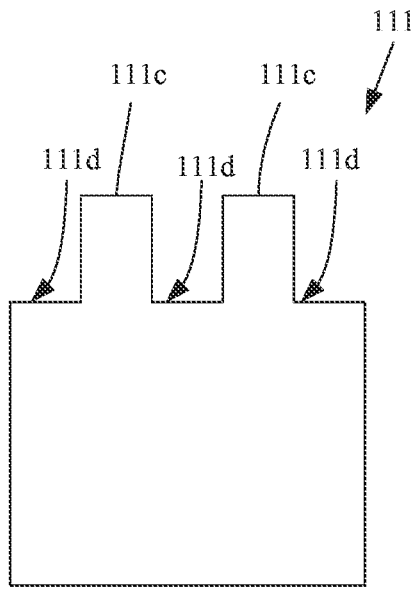
Figure 7:
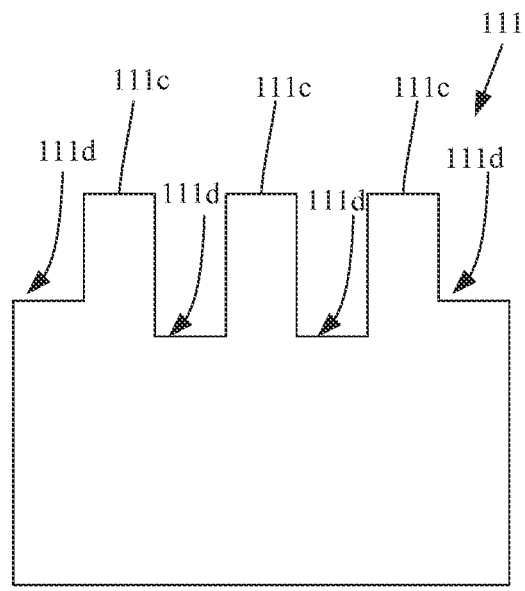

In varied embodiments of the present invention, as shown in FIGS. 5 to 7, the substrate 111 can have one convex shape or more than one convex shapes, and the plurality of recess portions 111d can be disposed at the two opposite sides of the convex portion 111c, respectively. In this case, as shown in FIG. 7, the plurality of recess portion 111d can also have different lengths or different depths. In this way, the optical transmitting devices 113 of different sizes can be accommodated according to the requirements. Furthermore, with the use of the convex shape of the substrate 111, the different circuits (such as a flexible circuit board connected to the optical transmitting devices 113) can be isolated from each other, so as to avoid the interference or crosstalk between each other due to the spatial overlapping.

Figure 8:
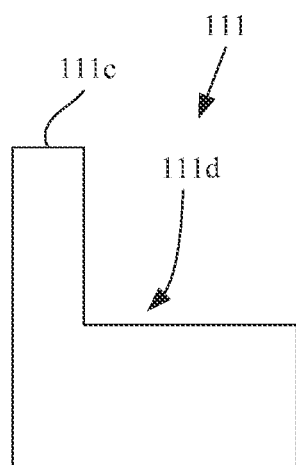
Figure 9:
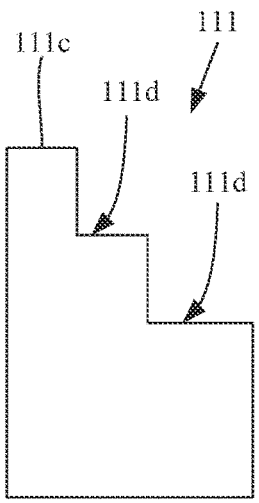

In varied embodiments of the present invention, as shown in FIG. 8, the substrate 111 can have at least one L-shaped shape, the at least one recess portion 111d is positioned to at least one side of the convex portion 111c. As shown in FIG. 9, the substrate 111 can have at least one stepped shape and the recess portions 111d can be disposed to at least one side of the convex portion 111c.

In addition, in some embodiments of the present invention, different circuits can be disposed on the first surface 111a and the second surface 111b of the substrate 111, respectively, so as to arrange more different circuits, chips, or components. For example, the optical receiving module 114 can be arranged on the first surface 111a of the substrate 111, and the processor 112 and the IC chip (e.g., but not limited to the LDD, PA, CDR, DSP chip, etc.) can be arranged on the second surface 111b of the substrate 111. In this way, the arrangement space of the circuits or chip can be increased and the size of the substrate 111 can be reduced accordingly. In another embodiment, the at least one optical receiving device 114 can be mounted on the second surface 111b of the substrate 111 with a chip-on-board manner.

In some embodiments, the optical transceiver module 110 may be applied to a parallel-single-mode-4-lane (PSM4) technology, wherein the plurality of optical transmitting devices 113 can introduce light of different wavelengths to one single-mode optical fiber for middle distance and long distance transmission in the single-mode optical fiber, and the optical receiving device 114 can receive the optical signal, and the received optical signal is performed to a light-split process by the de-multiplexer, and the split optical signals are introduced to different channels. In varied embodiments, in addition to the PSM4 technology, the optical transceiver 110 also can be applied to any related optical communication technologies, such as wavelength-division multiplexing (WDM), binary phase shift keying modulation (BPSK), quadrature phase shift keying modulation (QPSK), conventional/coarse wavelength division multiplexing (CWDM), dense wavelength division multiplexing (DWDM), optical add/drop multiplexer (OADM), and reconfigurable optical add/drop multiplexer (ROADM), LR4 or other communication technologies.

Referring to FIG. 4 the at least one optical transmitting device 113 can be connected to the substrate 111 through the at least one connecting board 117 and the plurality of optical transmitting devices 113 can be arranged in the alternating manner. In this case, there is an angle between light outputting directions (i.e. the emission directions of the light signals) of the plurality of optical transmitting devices 113. The angle may be in a range of 90 degrees to 180 degrees, such as 150 degrees~180 degrees. In some embodiments, the angle may be about 180 degrees. That is, the plurality of optical transmitting devices 113 can be arranged interlaced back and forth in the alternating manner. When the plurality of optical transmitting devices 113 are arranged in the alternating manner, the light output directions of the plurality of optical transmitting devices 113 can be approximately opposite to each other or different to each other. That is, the angle between the light outputting directions of the plurality of optical transmitting devices 113 may be about 180 degrees.

Referring to FIG. 4 again, each of the optical transmitting devices 113 can comprise an optical transmitter 113a, a hermetic housing 113b and a cylindrical element 113c, and the optical transmitter 113a is completely sealed and packaged in one or more than one hermetic housing 113b. That is, the optical transmitter 113a sealed in the optical transmitting devices 113 will not be exposed to the outside environment or air, thereby preventing the optical transmitter 113a from degradation, as well as enhancing a performance and the life time of the optical transmitter 113a. In embodiments of the present invention, an air tightness of the hermetic transmitting devices 113 at least satisfies the requirement of the air tightness of an industrial transmitter optical sub-assembly (TOSA). In varied embodiments, the air tightness of each of the optical transmitting devices 113 can be in the range of $1 \times 10^{-12}$ to $5*0^{-7}$ (atm*cc/sec). In some embodiments, more specifically, the air tightness of the optical transmitting devices 113 can be in the range of $1 \times 10^{-8}$ to $5*10^{-8}$ (atm*cc/sec).

In varied embodiments, a wavelength of at least one optical signal transmitted from the optical transmitter 113a of the optical transmitting devices 113 is within the range of the near-infrared light spectrum or the infrared light spectrum. That is, the wavelength of the at least one optical signal transmitted from the optical transmitter 113a is in the range of 830 nm to 1660 nm. The optical transmitter 113a can be any type of laser chip suitable for producing optical signals, such as an edge-emitting device (such as FP/DFB/EML) or a vertical-cavity surface-emitting laser (VCSEL).

In varied embodiments of the present invention, the optical transmitter 113a can be directly sealed in the hermetic housing 113b without exposed clearance, so as to ensure the tightness of the optical transmitting devices 113. In some embodiments, the hermetic housing 113b is, for example, a cylindrical housing. The cylindrical elements 113c are arranged on one side of the hermetic housing 113b. A coupling lens (not shown), such as a convex lens or a spherical lens, can be disposed in the interior of the cylindrical elements 113c for coupling light signals emitted from the optical transmitter 113a to an external fiber through the cylindrical elements 113c. Therefore, the light outputting direction of the optical transmitting devices 113 is from the optical transmitter 113a in the hermetic housing 113b towards the cylindrical elements 113c.

In varied embodiments of the present invention, a diameter or a width of the hermetic housing 113b is greater than a diameter or a width of the cylindrical elements 113c. Therefore, with the use of the intersected arrangement, the plurality of optical transmitting devices 113 can be arranged more closely, so as to reduce the configuration space thereof. In this way, more optical transmitting devices can be configured and encapsulated into a small optical transceiver module 110, and the miniaturization of optical transceiver module is available.

Figure 10:
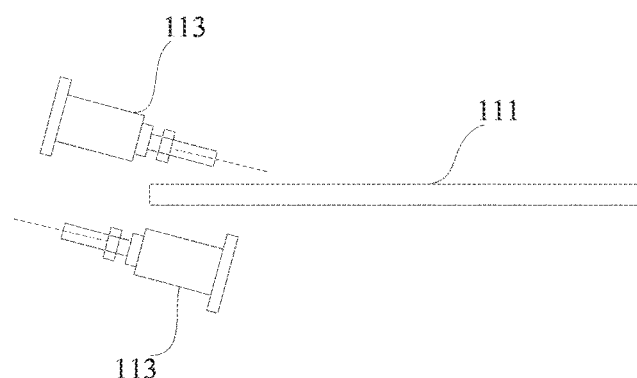
FIGS. 10 to 11 are schematic diagrams showing to the substrate and the optical transmitting devices in different embodiments of the present invention.

Referring to FIG. 10, in varied embodiments of the present invention, the plurality of optical transmitting devices 113 can be positioned on an upper side and a lower side of the substrate 111, respectively, and arranged in the alternating manner. Therefore, the plurality of optical transmitting devices 113 can be arranged at two opposite sides of the substrate 111 in the alternating manner.

Figure 11:
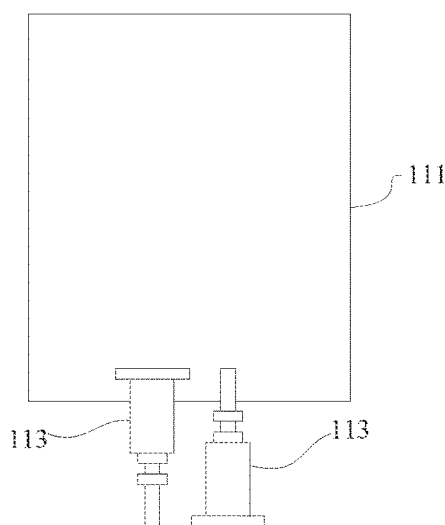

Referring to FIG. 11, in varied embodiments of the present invention, the plurality of optical transmitting devices 113 can be positioned at a same side of the substrate 111 and arranged in the alternating manner. Therefore, the plurality of optical transmitting devices 113 can be arranged at the same side of the substrate 111 in the alternating manner.

Figure 12:
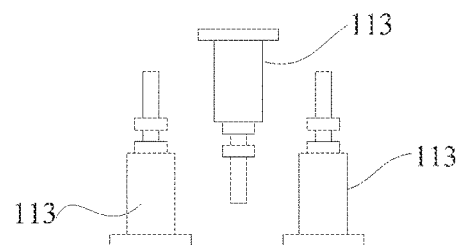
FIG. 12 is a schematic diagram showing the optical transmitting devices according to one embodiment of the present invention.

Referring to FIG. 12, in varied embodiments of the present invention, at least two (for example three or more) of the plurality of optical transmitting devices 113 can be arranged interlaced with each other in the alternating manner, so as to arrange more optical transmitting devices 113 in the alternating manner.

In varied embodiments of the present invention, as shown in FIG. 4 and FIG. 10, there is a tilt angle between the optical transmitting devices 113 and the substrate 111. That is, there is the tilt angle between the light outputting directions of the optical transmitting devices 113 and the substrate 111. The tilt angle between the optical transmitting devices 113 and the substrate 111 can be less than 90 degrees, such as, 30 degrees, 60 degrees, or 45 degrees. Therefore, the optical transmitting devices 113 can be arranged obliquely to reduce the configuration space of the optical transmitting devices 113. More specifically, in some embodiments, the tilt angle of the optical transmitting devices 113 can be formed and fixed by the optical transmitting holder 118. However, in varied embodiments of the present invention, the tilt angle of the optical transmitting devices 113 can be achieved and fixed by different configurations or methods but not limited to the above description. For example, in some embodiments, the tilt angle of the optical transmitting devices 113 can also be fixed by a fixing adhesive.

In varied embodiments of the present invention, as shown in FIG. 4, the plurality of optical transmitting devices 113 can also be interlaced up and down and arranged obliquely at the same time. In this case, two opposite sides of each of the optical transmitting devices 113 can have different sizes, and thus the optical transmitting devices 113 can be arranged more closely in the optical transceiver module 110, so as to enhance the miniaturization of the optical transceiver module.

Figure 13:
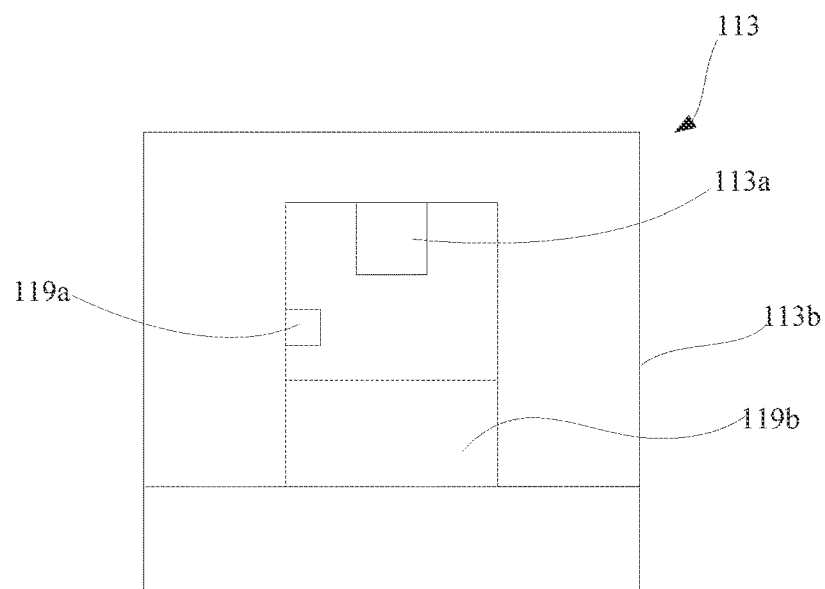
FIG. 13 is a schematic diagram showing the optical transmitting devices according to one embodiment of the present invention.

Referring to FIG. 13, in varied embodiments of the present invention, each of the optical transmitting devices 113 can further comprise at least one temperature control unit 119, and the temperature control unit 119 can be arranged in the hermetic housing 113b. In some embodiments, the temperature control unit 119 can comprise at least one thermistor 119a and at least one thermoelectric cooler 119b, and the thermistor 119a can be disposed on a base of the optical transmitter 113a. The thermoelectric cooler 119b is, for example, disposed in the hermetic housing 113b and close to the optical transmitter 113a, and the thermistor 119a is electrically connected to the thermoelectric cooler 119b. In this case, a resistance value of the thermistor 119a is varied according to a temperature of the optical transmitter 113a. Therefore, with the use of the thermistor 119a, the temperature of the optical transmitter 113a can be detected. Furthermore, by controlling a current flow direction of the thermoelectric cooler 119b, the temperature of the optical transmitter 113a can be cooled down, so as to control the optical transmitter 113a within a reasonable temperature range (such as 40-50 degrees), thereby reducing the wavelength shift caused by the temperature change in the optical transmitter 113a. In addition, a thermal loading of the optical transmitting devices 113 can be significantly reduced, thereby reducing the power consumption of the optical transmitting devices 113. In this way, for example, a power consumption of the single optical transmitting device 113 can be reduced within a range of 0.1 W to 0.2 W. For example, the total power consumption of four optical transmitting devices 113 can be reduced within a range of 0.4 W to 0.8 W. In one embodiment, the thermistor 119a and the thermoelectric cooler 119b can be fixed on the base of the optical transmitter 113a by, for example, a thermal conductive adhesive.

However, it is not limited thereto, in some embodiments, the plurality of the optical transmitting devices 113 can be controlled by the single temperature control unit 119.

Referring to FIG. 3, the coupler 115 can provide a redirection mechanism to exchange light between the optical transceiver module 110 and something external to this system (e.g., another device) over optical fibers (not shown). For example, the coupler 115 can provide a redirection of optical signals via a reflection surface. The angle and general dimensions and shape of the coupler 115 are dependent on the wavelength of optical light rays, as well as the material used to make the coupler and the overall system requirements. In one embodiment, the coupler 115 is designed to provide redirection of vertical light from the substrate 111 and of horizontal light to the substrate 111.

Various communication protocols or standards can be used for embodiments described herein. Communication protocols can include, but are not limited to, mini Display Port, standard Display Port, mini universal serial bus (USB), standard USB, PCI express (PCIE), or high-definition multimedia interface (HDMI). It will be understood that each different standard can include a different configuration or pin out for the electrical contact assembly. Additionally, the size, shape and configuration of the coupler 115 or connector can be dependent on the standard, including tolerances for the mating of the corresponding connectors. Thus, the layout of the coupler or connector to integrate the optical I/O assembly can be different for the various standards. As will be understood by those of skill in the art, optical interfaces require line-of-sight connections to have an optical signal transmitter interface with a receiver (both can be referred to as lenses). Thus, the configuration of the coupler 115 or connector will be such that the lenses are not obstructed by the corresponding electrical contact assemblies if present. For example, optical interface lenses can be positioned to the sides of the contact assemblies, or above or below, depending on where space is available within the coupler or connector.

In one embodiment, the coupler 115 may use a Multi-Fiber Push On (MPO) standard, wherein the optical fibers can have multi-channels by one-by-one connecting. In one embodiment, an LR4 standard requirement can be achieved by using a CWDM/WDM system for multiplexing or de-multiplexing.

Referring to FIG. 3 again, the housing 116 is configured to protect and to assemble the substrate 111, the processor 112, the plurality of optical transmitting devices 113, the optical receiving device 114, and the connecting board 117. In other embodiments, the optical transceiver module 110 can further comprise a planar light-wave chip (PLC). The planar light-wave chip (PLC) can provide a plane for the transfer of light and its conversion to electrical signals, and vice versa. It should be understood that the planar light-wave chip (PLC) can be integrated into the coupler 115. In one embodiment, the housing 116 can comprise at least one upper housing 116a and at least one lower housing 116b, and the upper housing 116a and the lower housing 116b can be assembled into one body to form an internal space therein for receiving the substrate 111, the processor 112, the plurality of optical transmitting devices 113, the optical receiving device 114 and the connecting board 117. In some embodiments, the housing 116 is, for example, made of a metal material, so as to shield the circuit therein, and to effectively distribute the heat generated from the electronic circuit.

Referring to FIG. 4 again, the connecting board 117 is connected between the substrate 111 and the optical transmitting devices 113 for connecting and holding the optical transmitting devices 113, thereby allowing the optical transmitting devices 113 to be electrically connected to the substrate 111. That is, with the use of the connecting board 117, signals can be transmitted between the substrate 111 and the optical transmitting devices 113. More specifically, the connecting board 117 may be at least one flexible circuit board or at least one flexible printed circuit board (FPC) to transmit signals between the substrate 111 and the optical transmitting devices 113.

Referring to FIG. 4 again, with the use of the connecting board 117, the optical transmitting devices 113 can be disposed in the recess portion 111d of the substrate 111. More specifically, the connecting board 117 can be disposed in the recess portion 111d of the substrate 111 and connected to the substrate 111. The optical transmitting devices 113 can be disposed and connected to the connecting board 117. Therefore, with the use of the connecting board 117, the optical transmitting devices 113 can be disposed in the recess portion 111d of the substrate 111 and electrically connected to the substrate 111.

Referring to FIG. 4 again, the connecting board 117 can comprise at least one first connecting board 117a and at least one second connecting board 117b. In some embodiments, one end of the first connecting board 117a can be connected to the first surface 111a of the substrate 111, and one end of the second connecting board 117b can be connected to the second surface 111b of the substrate 111. Therefore, by means of the first connecting board 117a and the second connecting board 117b, the plurality of optical transmitting devices 113 can be electrically connected to the circuits on the opposite sides of the substrate 111, respectively, so as to form the interlaced configuration on the opposite sides of the substrate 111. In this case, the plurality of optical transmitting devices 113 can be disposed and packaged into the small optical transceiver module 110, thereby achieving the miniaturization of the optical transceiver module 110.

However, in some embodiments, the first connecting board 117a and the second connecting board 117b can also be connected to the same side (the first surface 111a or the second surface 111b) of the substrate 111, but not limited thereto.

Referring to FIG. 4 again, the first connecting board 117a and the second connecting board 117b can have different lengths and different shapes. To be more specific, in some embodiments, a length of the second connecting board 117b can be greater than a length of the first connecting board 117a. Therefore, through the use of the different lengths of the first connecting board 117a and the second connecting board 117b, the plurality of optical transmitting devices 113 can be arranged to form an interlaced configuration in the alternating manner. Therefore, the plurality of transmitting devices 113 can be arranged and encapsulated in the smaller optical transceiver module 110, so as to achieve the miniaturization thereof.

Referring to FIG. 4 again, one end of the connecting board 117 can have a bending structure (not marked), and the bending structure is connected to the optical transmitting devices 113. The bending structure can be formed corresponding to the tilt angle, positions or other arrangements of the optical transmitting devices 113, for corresponding to the arrangement of the optical transmitting devices 113s.

Furthermore, when the IC on the substrate 111 of the optical transceiver module 110 processes data of a high speed, the IC will generate a larger amount of power consumption and a higher heat. At this time, by means of the connecting board 117, the substrate 111 can be appropriately separated from the optical transmitting devices 113, so as to avoid the heat transferring from the substrate 111 to the optical transmitting devices 113, thereby effectively reducing the power consumption of the temperature control unit 119 and the optical transceiver module 110.

Figure 14:
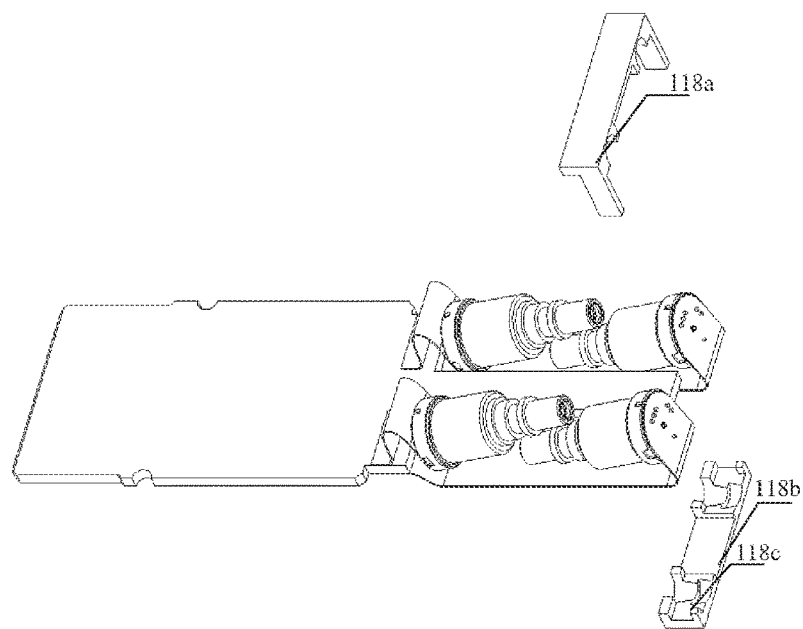
FIG. 14 is a schematic diagram showing the optical transceiver module according to one embodiment of the present invention.

Referring to FIG. 14, In varied embodiments of the present invention, the optical transmitting devices 113 can be fixed and positioned in the optical transceiver module 110 by at least one optical transmitting holder 118. Specifically, the optical transmitting holder 118 can be disposed in the housing 116 or on the substrate 111 of the optical transceiver module 110 for holding the optical transmitting devices 113. In some embodiments, the optical transmitting holder 118 can be integrally positioned to the housing 116 as one piece. In some embodiments, the at least one optical transmitting holder 118 can comprise a first holder 118a and a second holder 118b for fixing and holding the plurality of optical transmitting devices 113, so as to arrange the optical transmitting devices 113 in the alternating manner. As shown in FIG. 3 again, the first optical transmitting holder 118a can be disposed, for example, on an upper housing 116a, and the second optical transmitting holder 118b can be disposed, for example, on a lower housing 116b. In addition, the optical transmitting holder 118 can comprise at least one holding recess 118c, and the shape of the holding recess 118c is corresponding to the shape of the optical transmitting devices 113 for receiving and engaging the optical transmitting devices 113, (for example, the shape of the hermetic housing 113 or the cylindrical element 113c) so as to hold the optical transmitting devices 113. Furthermore, the shape of the holding recess 118c can also be formed corresponding to the tilt angle of the optical transmitting devices 113, so as to hold the optical transmitting devices 113 at the tilt angle.

Figure 14A:
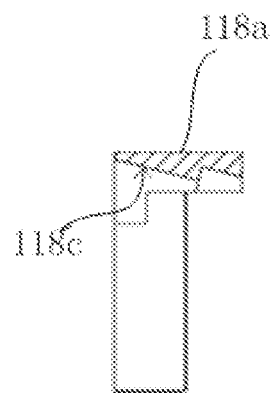
FIG. 14A and FIG. 14B are schematic diagrams showing the optical transmitting holder in one embodiment of the present invention.
Figure 14B:
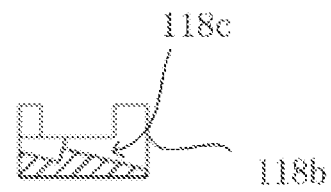

Specifically, as shown in FIGS. 14A and 14B, the holding recess 118c of the optical transmitting holder 118 (for example, the first optical transmitting holder 118a and the optical transmitting second holder 118b) can have an tilt angle, and the tilt angle of the holding recess 118c can be generally the same as the tilt angle of the optical transmitting devices 113, so as to secure and hold the optical transmitting devices 113 at the tilt angle.

Figure 15:
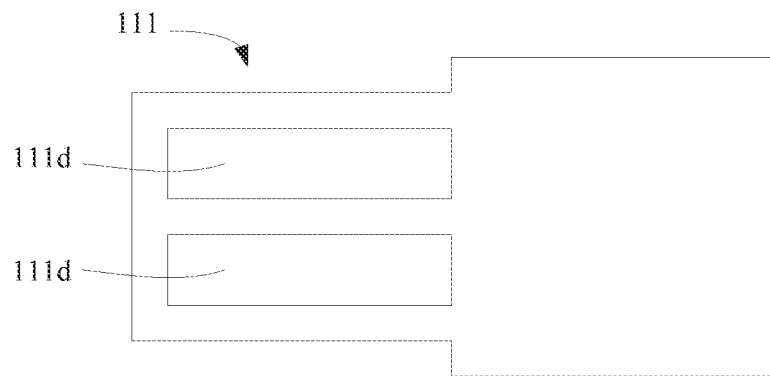
Figure 16:
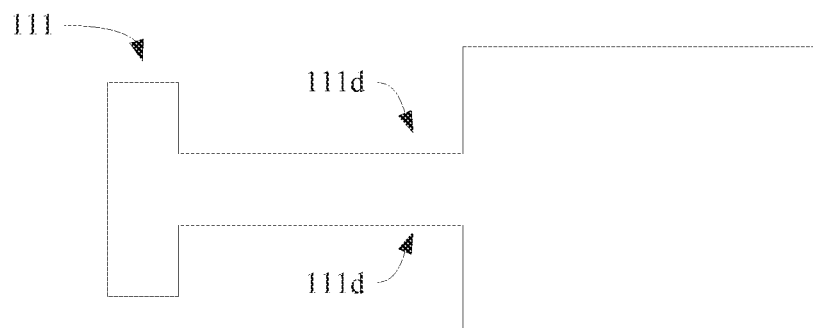

Referring to FIG. 15, in some embodiments, the recess portion 111d of the substrate 111 may be a hollow hole positioned on the substrate 111. Furthermore, as shown in FIGS. 16 and 17, through the use of the plurality of recess portions 111d, an I-shaped or F-shaped structure can be formed on the substrate 111. Therefore, the plurality of optical transmitting devices 113 can be accommodated on the substrate 111 through the use of the plurality of recess portion 111d on the substrate 111.

In varied embodiments, the size of each of the plurality of optical transmitting devices 113 and the substrate 111 can satisfy a design requirement of QSFP-DD, OSFP, QSFP56, QSFP28, QSFP+, or Micro QSFP+. For example, in one embodiment, the width of the substrate 111 can be in the range of 11 mm to 18 mm. For example, in one embodiment, the length of the substrate 111 can be in the range of 58 mm to 73 mm. 20 mm to 73 mm. In this manner, the size of each of the plurality of optical transmitting devices 113 can satisfy the requirement of QSFP-DD, OSFP, QSFP56, QSFP28, QSFP+, or Micro QSFP+. Therefore, by arranging the optical transmitting devices 113 and the at least one substrate 111, the plurality of optical transmitting devices 113 can be assembled packaged within the small optical transceiver module 110 for a compact design.

In varied embodiments of the present invention, more than one of optical receiving devices 114 can also be arranged interlaced with each other in the alternating manner, and a tilt angle is formed between light receiving directions of the plurality of optical receiving devices 114, and the tilt angle can be in a range of 90 degrees and 180 degrees.

In varied embodiments of the present invention, there can be a tilt angle between at least one optical receiving device 114 and the substrate 111, and the tilt angle between the receiving device 114 and the substrate 111 can be less than 90 degrees, for example, in the range of 0 to 90 degrees, such as 1 degree, 5 degrees, 30 degrees, 60 degrees or 45 degrees.

As shown in FIG. 18, in some embodiments, the optical receiving device 114 can be, for example, a cylindrical or tubular optical receiving device 114a, and can be, for example, a Transistor-Outline (TO) cylindrical optical receiving device. The air tightness of the cylindrical optical receiving devices 114a at least satisfies the requirement of the air tightness of an industrial transmitter optical subassembly (TOSA). In varied embodiments, the air tightness of each of the cylindrical optical receiving devices 114a can be in the range of $1 \times 10^{-12}$ to $5*10^{-7}$ (atm*cc/sec). In some embodiments, more specifically, the air tightness of the cylindrical optical receiving devices 114a can be in the range of $1 \times 10^{-8}$ to $5*10^{-8}$ (atm*cc/sec).

As shown in FIG. 18, the plurality of cylindrical optical receiving devices 114a can be assembled by an optical receiving holder 120. The optical receiving holder 120 is used for assembling and holding the plurality of cylindrical optical receiving devices 114a. In this case, the plurality of cylindrical optical receiving devices 114a can be fixed by the optical receiving holder 120. The plurality of cylindrical optical receiving devices 114a can be connected to the circuits on the substrate 111 through connecting boards 121. The connecting boards 121 may be flexible circuit boards or flexible printed circuit board (FPC) for transmitting signals between the substrate 111 and the cylindrical optical receiving devices 114a. Specifically, in an embodiment, as shown in FIG. 18 again, the plurality of cylindrical optical receiving devices 114a can be connected to the first connecting pad 122a and the second connecting pad 122b on the substrate 111 through the connecting boards 121, respectively. The first connecting pad 122a and the second connecting pad 122b can be formed on the substrate 111 and electrically connected to the circuits (not shown) on the substrate 111.

As shown in FIG. 19A and FIG. 19B, more specifically, the optical receiving holder 120 can include a plurality of holding holes 120a, and a number of the holding holes 120a is corresponding to a number of the plurality of cylindrical optical receiving devices 114a for allowing the cylindrical optical receiving devices 114a to be inserted through the holding holes 120a. Therefore, the plurality of cylindrical optical receiving devices 114a can be fixed in the optical receiving holder 120. In some embodiments, the inner aperture or size of each of the holding holes 120a can be larger than the outer size of the cylindrical optical receiving devices 114a, and hold the cylindrical optical receiving devices 114a through the use of adhesive. Furthermore, in some embodiments, the inner aperture or size of each of the holding holes 120a can be corresponding to the outer size of the cylindrical optical receiving devices 114a, so as to snugly assemble the cylindrical optical receiving devices 114a into the optical receiving holder 120. Specifically, for example, the cylindrical optical receiving devices 114a can have a first width and a second width of different dimensions (as shown in FIG. 19), and the holding hole 120a can also have a first inner diameter and a second inner diameter of different dimensions for corresponding to the first width and the second width of the cylindrical optical receiving devices 114a.

Figure 20:
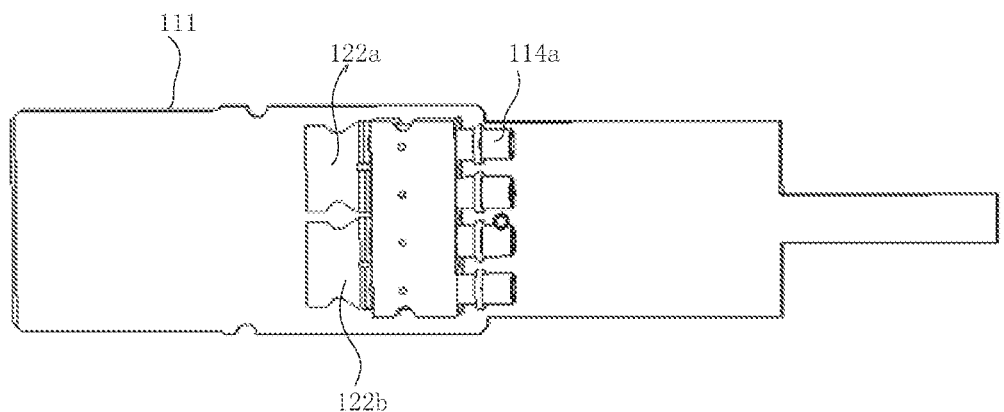
FIG. 20 is a schematic diagram showing the optical receiving device and the substrate according to one embodiment of the present invention.

As shown in FIG. 20, in an embodiment, the optical receiving holder 120 can be mounted on the substrate 111 for securing the plurality of cylindrical optical receiving devices 114a on the substrate 111. However, it is not limited thereto, and in some embodiments, the optical receiving holder 120 may not be mounted on the substrate 111 (as shown in FIG. 18).

It should be noted that, in varied embodiments of the present invention, the optical transmitting devices 113 and the optical receiving devices 114 can have different arrangements, combinations, and/or configurations. For example, in some embodiments, the optical transmitting devices 113 and the optical receiving devices 114 can be disposed in the same side of the substrate 111. However, it is not limited thereto, in some embodiments, the optical transmitting devices 113 and the optical receiving devices 114 can also be disposed at different sides of the substrate 111, respectively.

Figure 21:
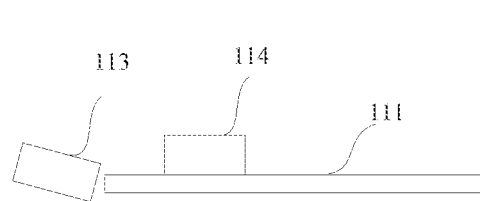
FIGS. 21 to 27 are schematic diagrams showing the optical transceiver module in different embodiments of the present invention.
Figure 22:
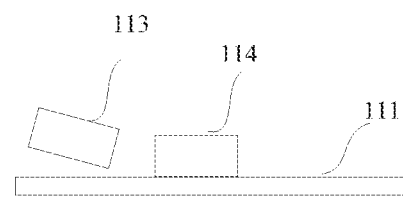

In some embodiments, one or more than one optical receiving devices 114 can be disposed in the substrate 111, and one or more than one optical transmitting devices 113 can be disposed obliquely at one side of the substrate 111 (as shown in FIG. 21), or disposed on the substrate 111 (as shown in FIG. 22).

Figure 23:
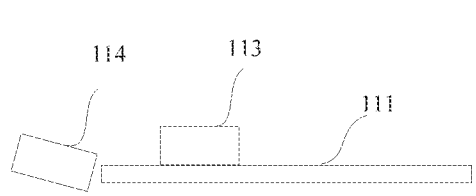
Figure 24:
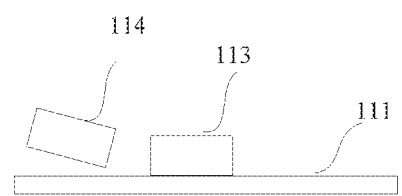

In addition, in some embodiments, one or more than one optical transmitting devices 113 can be disposed on the substrate 111, and one or more than one optical receiving devices 114 can be disposed obliquely at one side of the substrate 111 (as shown in FIG. 23), or be disposed on the substrate 111 (as shown in FIG. 24).

Figures 25, 26:
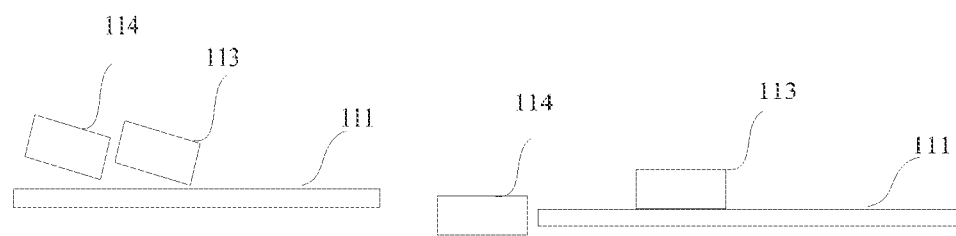

However, in some embodiments, the optical transmitting devices 113 and the optical receiving devices 114 can be disposed obliquely at one side (not shown) of the substrate 111, or be disposed on the substrate 111 (as shown in FIG. 25).

Figure 27:
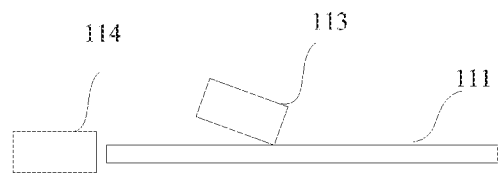

It should be noted that, when at least one of the optical receiving devices 114 is disposed at one side of the substrate 111 (for example, as shown in FIG. 18), the optical transmitting devices 113 can be disposed on the substrate 111 in parallel or obliquely (as shown in FIG. 26 and FIG. 27).

Figure 28:
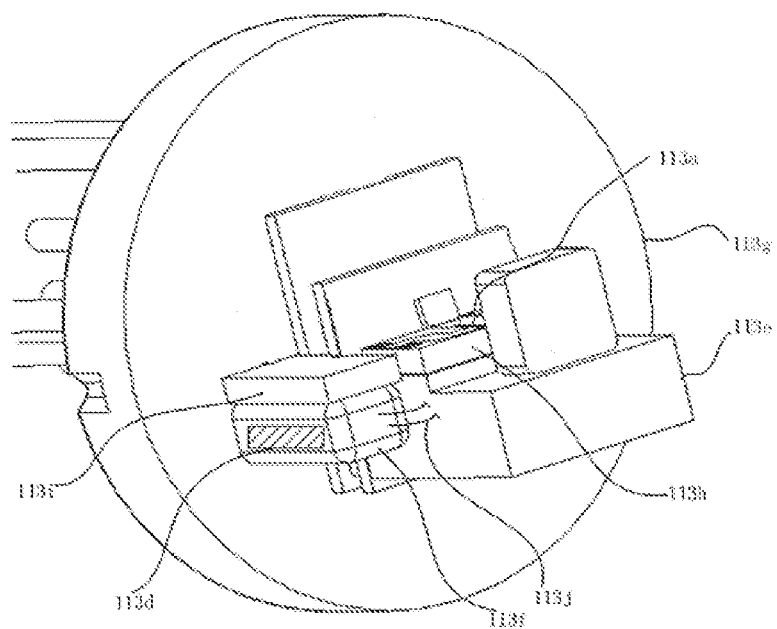
FIG. 28 is a schematic diagram showing the transmitting devices according to one embodiment of the present invention.

Referring to FIG. 28, in varied embodiments of the present invention, each of the optical transmitting devices 113 can further include at least one damping unit 113d, sub-mount bases 113e, 113f, and at least one base 113g. The optical transmitter 113a and the sub-mount bases 113e, 113f can be disposed in the hermetic housing 113b, and the optical transmitter 113a can be disposed on the base 113e, and the damping unit 113d can be disposed between the hermetic housing 113b and the sub-mount bases 113e, 113f, and the sub-mount bases 113e, 113f are disposed on the base 113g.

As shown in FIG. 28, the hermetic housing 113b and the base 113g can form a hermetic space for accommodating the optical transmitter 113a and the sub-mount bases 113e, 113f.

The sub-mount bases 113e and 113f can be extended from the base 113g to support the circuit boards 113h and 113i inside the optical transmitting devices 113. The sub-mount bases 113e, 113f can include a first base 113e and a second base 113f, and the second base 113f can be disposed in one side of the first base 113e adjacent to the hermetic housing 113b. The first base 113e is used for supporting the first circuit board 113h, and the optical transmitter 113a is electrically connected to the first circuit board 113h. The second base 113f is used for supporting the second circuit board 113i, and the second circuit board 113i is electrically connected to external signal lines (not shown).

The circuit boards 113h and 113i can include circuits, and the circuit boards 113h, 113i can be made of a material of a great thermal conductivity (for example, ceramic or copper) to improve a heat dissipation efficiency thereof.

In varied embodiments, the sub-mount bases 113e, 113f can be formed integrally on the base 113g. That is, the sub-mount bases 113e, 113f and the base 113g can have the same material, such as a metal having a great thermal conductivity. In some embodiments, the sub-mount bases 113e, 113f may be rectangular bases, but are not limited thereto, and in some embodiments, the sub-mount bases s 113e, 113f may be cylindrical, semi-cylindrical, tapered, or other solid shapes.

In varied embodiments, the damping unit 113d may be disposed between the sub-mount bases 113e, 113f and the hermetic housing 113b for absorbing electromagnetic energy inside the optical transmitting devices 113, thereby reducing a high frequency resonance mode in the optical transmitting devices 113, as well as mitigating the resonance phenomenon when transmitting the high-frequency signals, so as to reduce the signal distortion phenomenon and allow higher frequency signals to be transmitted, such as 5 Gbps~50 Gbps NRZ, 25 Gbps~100 Gbps PAM4 or other higher frequency signals.

In varied embodiments, the damping unit 113d may be at least one sheet, at least one film, at least one thick film, at least one block, at least one strip, powders, or at least one arbitrary shape formed of a predetermined damping material for absorbing the electromagnetic energy inside the optical transmitting devices 113, as well as mitigating the resonance phenomenon when transmitting the high-frequency signals. The resistance of the damping unit 113d may be in the range of 1 ohm ($\Omega$) to 500 ohms, and for example, in the range of 5 ohms ($\Omega$) to 100 ohms.

In some embodiments, the damping unit 113d can be, for example, a resistance unit formed of one or more materials, so as to mitigate the high frequency resonance phenomena in the optical transmitting devices 113. The material of the damping unit 113d may be, for example, a pure metal, a metal alloy, a metal compound, a metal oxide, a metal mixed material (for example, a combination of ceramic and metal), a semiconductor, or other materials.

In some embodiments, the damping unit 113d can include at least one thin film layer and at least one metal layer (not shown), and the thin film layer may be formed, for example, of an insulating material (such as ceramic) or a composite material, and the metal layer can be positioned to two sides of the thin film layer, and the metal layer is formed, for example, of titanium, platinum, gold, other metals, or any alloy.

In some embodiments, the thickness of the damping unit 113d can be less than 1 mm, such as in the range of 0.01 mm to 0.4 mm.

In some embodiments, the damping unit 113d can be, for example, formed on a side surface of the sub-mount bases 113e, 113f closest to the hermetic housing 113b. For example, in an embodiment, the damping unit 113d can be formed on a side surface of the second sub-mount base 113f and closest to the hermetic housing 113b for mitigating the high frequency resonance phenomenon in the optical transmitting devices 113. However, it is not limited thereto, the damping unit 113d can be formed at other positions of the sub-mount bases 113e, 113f for mitigating the high frequency resonance phenomenon in the optical transmitting devices 113. For example, in another embodiment, the damping unit 113d can also be formed on a side surface of the first sub-mount base 113e and located between the base 113e and the hermetic housing 113b, so as to mitigate the high frequency resonance phenomenon in the optical transmitting devices 113.

Referring to FIG. 28, In varied embodiments of the present invention, each of the optical transmitting devices 113 can further include a plurality of connecting wires 113j. The connecting wires 113j can be formed of a conductive material and connected between the space between the first sub-mount base 113e and the second sub-mount base 113f for absorbing the electromagnetic energy inside the optical transmitting devices 113, as well as mitigating the high frequency resonance phenomenon in the optical transmitting devices 113.

Referring to FIG. 29 again, in varied embodiments of the present invention, each of the optical transmitting devices 113 can further include at least one optical lens 113L and at least one optical window 113w. The optical lens 113L can be disposed inside the hermetic housing 113b and the optical lens 113L is positioned to the optical transmitter 113a for optically improving the optical signal emitted from the optical transmitter 113a, such as focusing, collimating, diverging, and the like. In some embodiments, the optical lens 113L can be disposed on the sub-mount base 113e and positioned to the optical transmitter 113a. However, it is not limited thereto, in varied embodiments of the present invention, the optical lens 113L and the optical transmitter 113a can also be disposed in the same circuit board.

Figure 29:
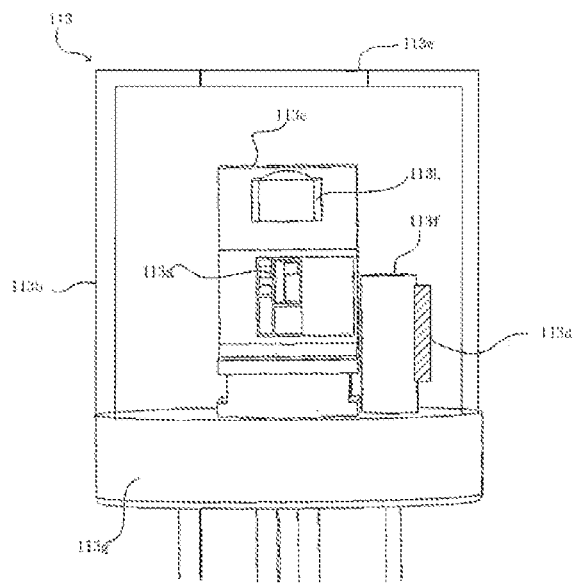
FIG. 29 is a schematic diagram showing the transmitting devices according to one embodiment of the present invention.

As shown in FIG. 29, the optical window 113w can be disposed on the hermetic housing 113b, for example, at a front end of the hermetic housing 113b and positioned to the optical lens 113L, so as to allow the improved optical signals from the optical lens 113L to be emitted outside the hermetic housing 113b through the optical window 113w. In some embodiments, the optical window 113w can be a planar translucent plate, so as to allow the improved optical signals from the optical lens 113L to be emitted outside the hermetic housing 113b. However, it is not limited thereto, in varied embodiments, the optical window 113w can be used to further optically improve the optical signals from the optical lens 113L, so as to further improve the optical path of the optical signals.

It is worth mentioning that the optical lens 113L can be directly disposed inside the hermetic housing 113b and positioned to the optical transmitter 113a, thereby more accurately controlling the optical alignment between the optical lens 113L and the optical transmitter 113a, so as to improve the accuracy of the optical path, and to reduce the energy loss of the optical signals. In some embodiments, the material of the optical lens 113L can be different from the material of the optical window 113w. More specifically, the material of the optical lens 113L can be, for example, glass materials or a novel silicon-based material (such as silicon based micro-lens) of a low absorption rate for a specific wavelength (for example, 1200 nm~1600 nm).

Figure 30A:
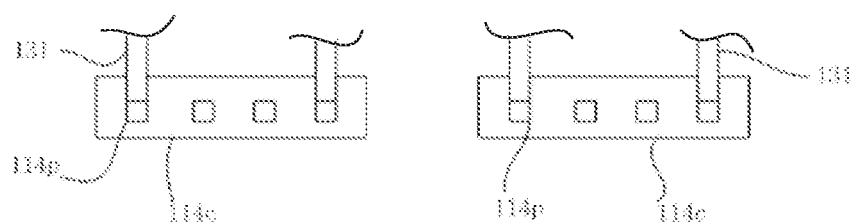
FIG. 30A and FIG. 30B are schematic diagrams showing an optical receiving chip according to one embodiment of the present invention.

Referring to FIG. 30A, in some embodiments, the optical receiving devices 114 can include one or more optical receiving chips 114c. The optical receiving chips 114c may be elongated chips and connected to the substrate 111. Each of the optical receiving chips 114c can include a plurality of optical receivers (PD) 114p arranging along a direction, for example, along a longitudinal direction of the optical receiving chip 114c, and the number of a plurality of optical fibers 131 connected to the chip 114c is less than the number of the plurality of optical receivers 114p of the optical receiving chip 114c.

As shown in FIG. 30A, more specifically, for example, in an embodiment, two of the optical receiving chips 114c can be arranged (such as die-bonded) on the substrate 111. For example, each of the optical receiving chips 114c can include four optical receivers 114p. In this case, two of the optical fibers 131 can be connected to two of the optical receivers 114p on the optical receiving chips 114c. With this configuration, a connecting margin between the optical fiber 131 and the optical receiver 114p can be enhanced and the connecting accuracy between the optical fiber 131 and the optical receiver 114p can also be improved, so as to promote the coupling accuracy between the optical fiber 131 and the optical receivers 114p. It should be noted that, but not limited to this, in other embodiments, each of the optical receiving chip 114c can also include more or less than four optical receivers 114p.

Figure 30B:
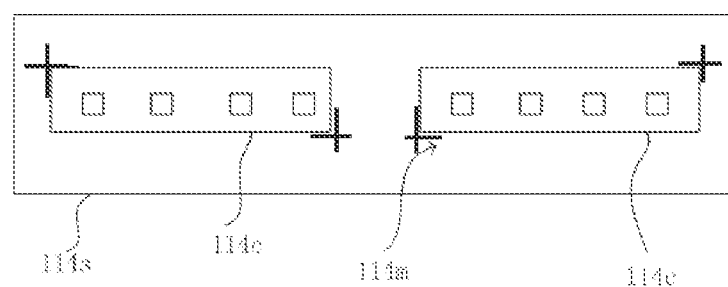

Referring to FIG. 30B, in some embodiments, the optical receiving devices 114 can include at least one position base 114s, and the sub-mount 114s can be disposed on the substrate 111 for aligning the optical receiving chip 114c. The sub-mount 114s can include one or more alignment marks 114m. The optical receiving chip 114c can be disposed on the position base 114s and aligned by the alignment mark 114m, thereby improving the alignment accuracy between the optical fibers 131 and the optical receiving chips 114c, as well as increasing the coupling accuracy between the optical fibers 131 and the optical receiving chips 114c.

Figure 31A:
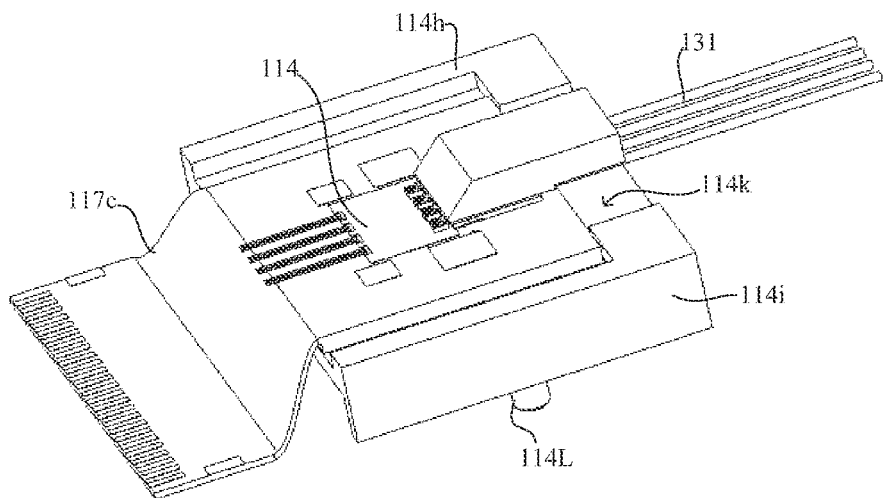
FIG. 31A is a schematic diagram showing the receiving devices and an optical receiving holder according to one embodiment of the present invention.
Figure 31B:
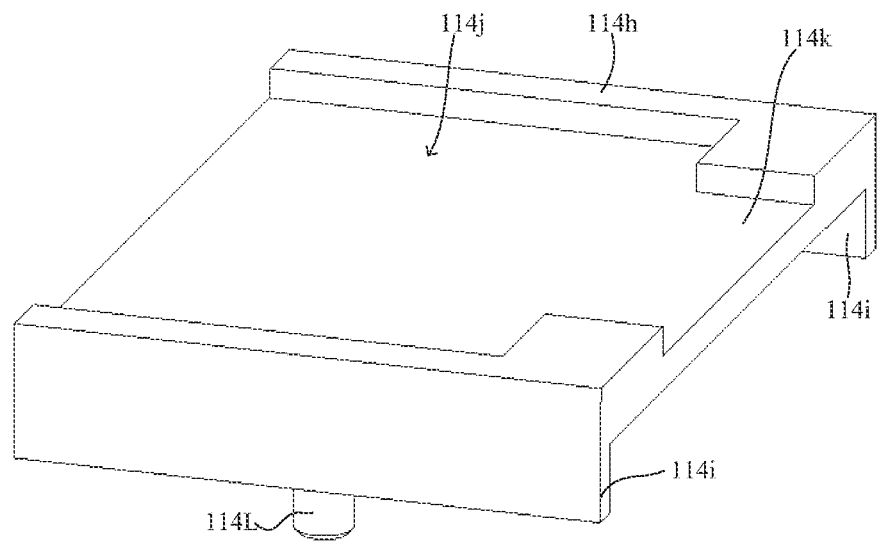
FIG. 31B is a schematic diagram showing the optical receiving holder according to one embodiment of the present invention.
Figure 32A:
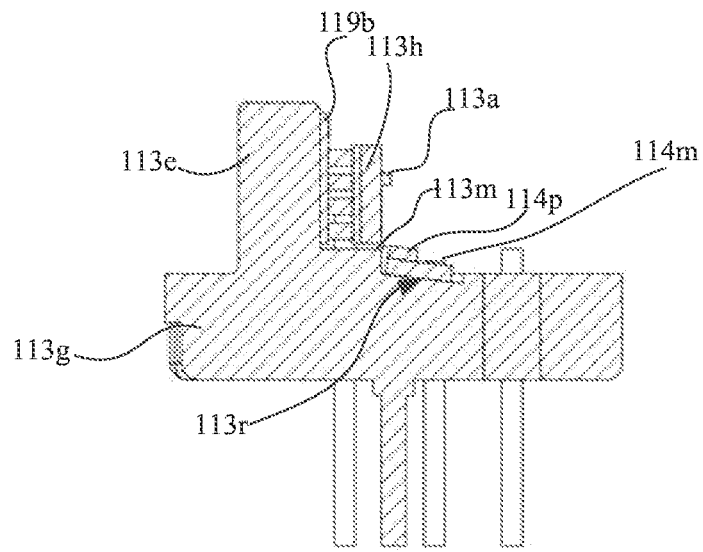
Figure 32B:
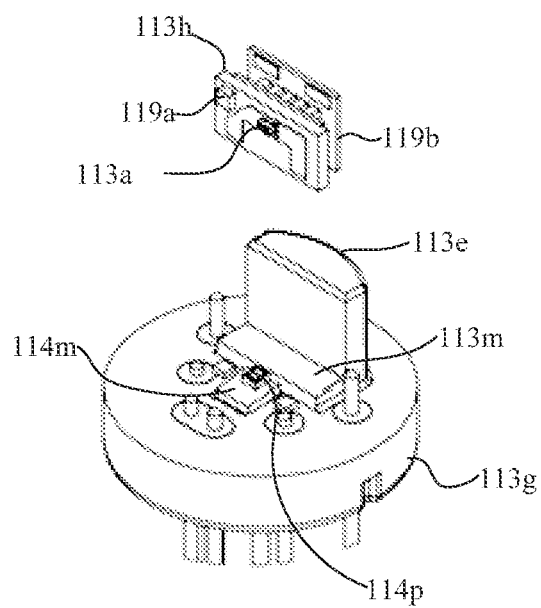

Referring to FIG. 31A and FIG. 31B, in some embodiments, the optical transceiver module 110 can further include at least one optical receiving holder 114h for arranging the optical receiving devices 114 on the substrate 111 and forming a gap G (for example, 10 micrometers~5 centimeters) between the optical receiving holder 114h and the substrate 111, so as to allow more components (such as ICs and/or passive components) to be arranged in the gap G, thereby increasing the arrangement space of the substrate 111. The optical receiving holder 114h can include at least one supporting unit 114i, at least one mounting plane 114j, at least one positioning recess 114k, and at least one positioning protrusion 114L. The supporting unit 114i is formed at one side of the optical receiving holder 114h for supporting the optical receiving holder 114h on the substrate 111 and forming the gap G between the optical receiving holder 114h and the substrate 111. The mounting plane 114j is formed at the opposite side of the optical receiving holder 114h for mounting the optical receiving devices 114. The positioning recess 114k is formed on the optical receiving holder 114h for positioning the optical receiving devices 114 and the optical fiber 131 on the optical receiving holder 114h. In some embodiments, the mounting plane 114j can be formed in the positioning recess 114k. The positioning protrusion 114L can be formed on the supporting unit 114i for positioning the optical receiving holder 114h on the substrate 111.

As shown in FIG. 31A, the optical receiving devices 114 can be disposed on the mounting plane 114*j* of the optical receiving holder 114*h* and electrically connected to the substrate 111 through the flexible circuit board 117*c*. By using the optical receiving holder 114*h*, the gap space G can be formed between the optical receiving holder 114*h* and the substrate 111, so as to increase more space for arranging more components on the substrate 111. It is worth noted that in some embodiments, the optical receiving holder 114*h* can include more mounting planes 114*j* to arrange more components.

As shown in FIG. 31B, more specifically, the optical receiving holder 114*h* can include, for example, two supporting units 114*i* to form an inverted U-shaped structure. However, it is not limited thereto, in other embodiments, the optical receiving holder 114*h* can include one or more support units 114*i* to support the optical receiving devices 114 on the substrate 111.

Referring to FIGS. 32A to 35, in some embodiments, the temperature control unit 119 can be disposed on the sub-mount base 113*e* of the optical transmitting devices 113, and the sub-mount base 113*e* is positioned in the hermetic space formed by the hermetic housing 113*b* and the base 113*g*, and extending from the base 113*g*. The thermoelectric cooler 119*b* of the temperature control unit 119 can be disposed on a side surface of the sub-mount base 113*e*, and the optical transmitter 113*a* can be disposed on the thermoelectric cooler 119*b*. With the use of this arrangement, the heat of the optical transmitter 113*a* can be considerably transferred to the thermoelectric cooler 119*b*, thereby reducing the total heat capacity of the optical transmitter 113*a* without adding additional heat sinks. Therefore, the thermoelectric cooler 119*b* can use less driving current to achieve a wide temperature control interval, and to improve a reaction time for the thermal equilibrium, and the total power consumption can be reduced. It is worth mentioning that, in different embodiments, the optical transmitter 113*a* on the thermoelectric cooler 119*b* can also be applied and disposed in a non-hermetic housing.

As shown in FIGS. 32A to 35, more specifically, the optical transmitter 113*a* is disposed on the circuit board 113*h*, and the circuit board 113*h* is in contact with a largest surface of the thermoelectric cooler 119*b*, thereby arranging the optical transmitter 113*a* on the thermoelectric cooler 119*b*. Therefore, the heat of the optical transmitter 113*a* can be considerably transferred to the thermoelectric cooler 119*b*. In this case, the largest surface of the thermoelectric cooler 119*b* is substantially perpendicular to a largest surface of the base 113*g*. More specifically, there is an angle between the largest surface of the thermoelectric cooler 119*b* and the largest surface of the base 113*g*, and the angle may be in a range of 80 degrees to 100 degrees. In addition, the thermistor 119*a* can be disposed on the circuit board 113*h*, and be electrically connected to the thermoelectric cooler 119*b*. With the use of the thermistor 119*a*, the temperature of the optical transmitter 113*a* can be detected.

It is worth mentioning that, in different embodiments, the sub-mount base 113*e* may be formed of a great thermally conductive material and extended from the base 113*g*. Therefore, the sub-mount base 113*e* can be used as a heat sink for the optical transmitter 113*a*.

Figure 34A:
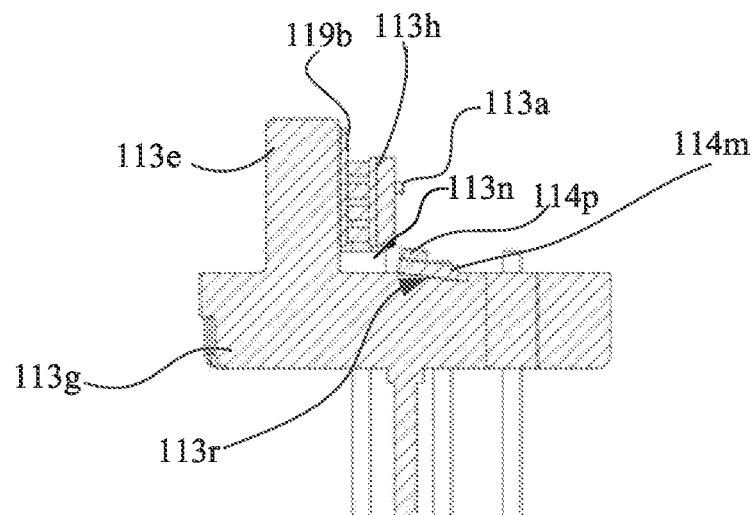
Figure 34B:
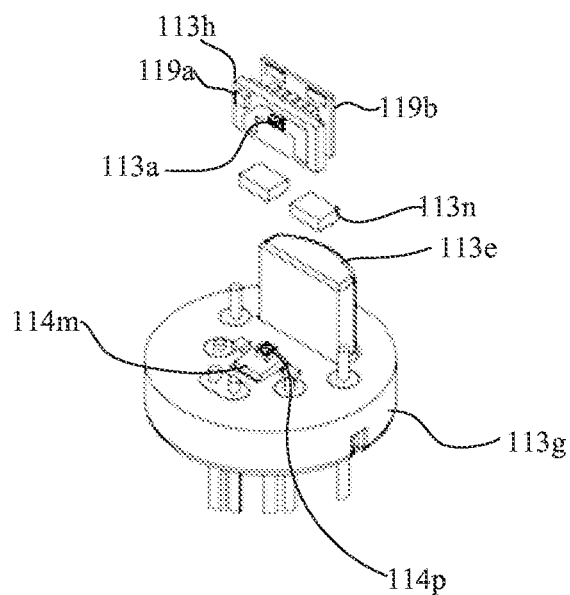
Figure 35:
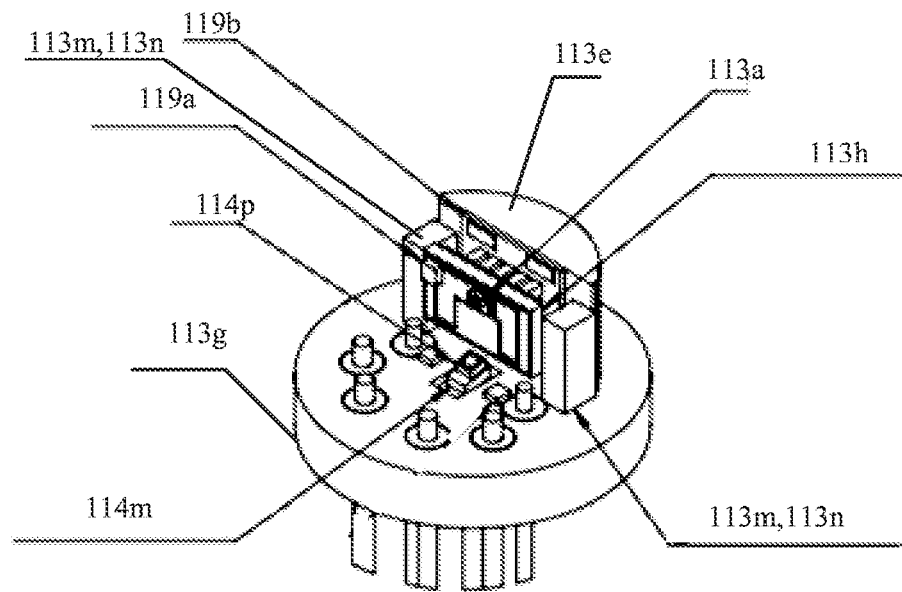

As shown in FIGS. 32A to 35, in different embodiments, the optical transmitting device 113 can further comprises at least one supporting block 113*m*,113*n*, and the at least one supporting block 113*m*,113*n* can be configured to reduce a length of ground wires of the circuit board 113*h*. More specifically, the supporting block 113*m*, 113*n* can be disposed between the sub-mount bases 113*e* and the base 113*g*, or disposed at one side or two sides of the circuit board 113*h* (as shown in FIG. 35). In addition, the support block 113*m*, 113*n* can be made of a conductive material and connected between the ground end of the circuit board 113*h* and the base 113*g*. Therefore, with the support block 113*m*, 113*n* of the conductive material, the ground end of the circuit board 113*h* can be electrically connected to the ground end of the base 113*g*, thereby reducing the length of ground wires inside the optical transmitter 113*a* for achieving high-speed signals.

Figure 33A:
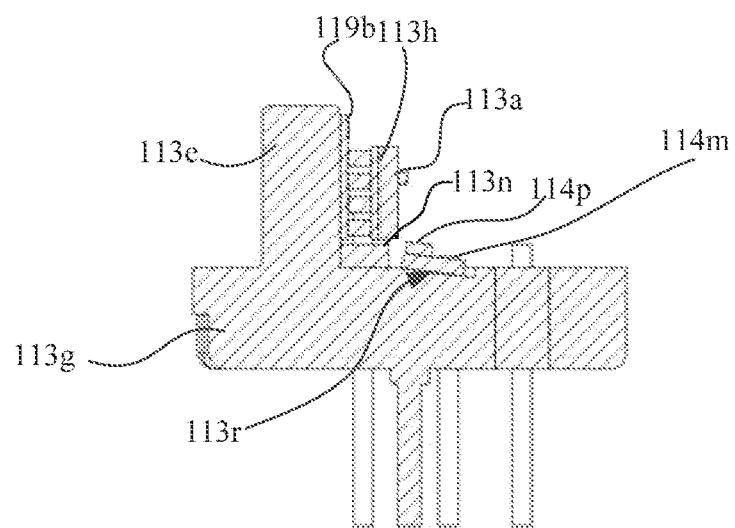
Figure 33B:
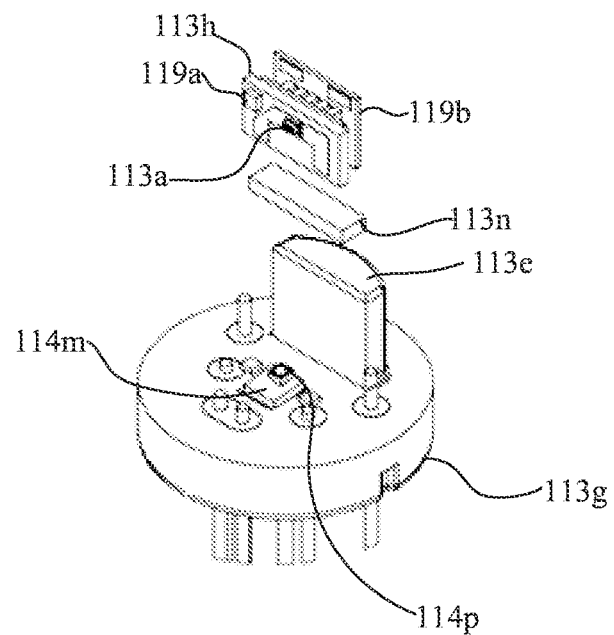

In different embodiments, the at least one support block 113*m* can be formed as one-piece together with the base 113*g* (as shown in FIG. 33A and FIG. 33B). However, it is not limited thereto, in some embodiments, the at least one support block 113*n* can be independent from base 113*g* (as shown in FIG. 34A and FIG. 34B).

As shown in FIG. 35, in some embodiments, the support blocks 113*m*, 113*n* can disposed at both sides of the circuit board 113*h* for supporting as well as reducing the length of ground wires of the circuit board 113*h*.

Furthermore, as shown in FIGS. 32A to 34B, in different embodiments, the optical receiver 114*p* can be integrated into the optical transmitting devices 113. Specifically, the base 113*g* can include at least one base recess 113*r* to receive the circuit board 114*m*, and the optical receiver 114*p* can be fixed on the circuit board 114*m*, thereby arranging the optical receiver 114*p* on the base 113*g*. It is worth mentioning that, the optical receiver 114*p* and the optical transmitter 113*a* can be positioned at the same optical direction, and optical receiver 114*p* can detect a larger value of the backlight monitoring current, so as to facilitate the matching design for the TO and TRX circuits.

More specifically, as shown in FIGS. 32A to 34B, in different embodiments, the base recess 113*r* of the base 113*g* can have a tilt angle, such as 5 degrees-45 degrees, according to an incident angle of the optical receiver 114*p*, so as to improve the light receiving efficiency of the optical receiver 114*p*.

Figure 36:
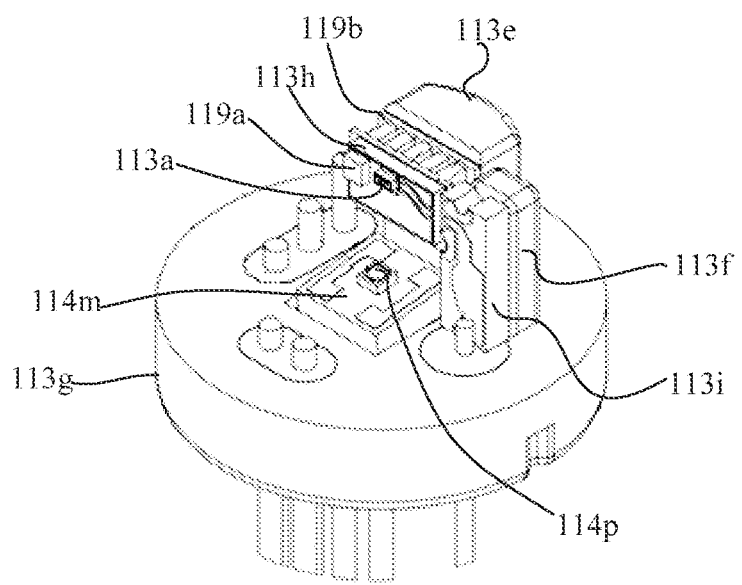

Furthermore, as shown in FIG. 36, in some embodiments, the sub-mount bases 113*e*, 113*f* can be formed on the base 113*g*. The first sub-mount base 113*e* is configured to support the first circuit board 113*h* and the thermoelectric cooler 119*b*, and the optical transmitter 113*a* is electrically connected to the first circuit board 113*h*. The second sub-mount base 113*f* is configured to support the second circuit board 113*i*, and the second circuit board 113*i* is electrically connected to external circuits (not shown).

Referring to FIGS. 37A to 39, in different embodiments, the plurality of optical transmitting devices 113 can comprise a plurality of first optical transmitting devices 313*a* and a plurality of second optical transmitting devices 313*b*, and the first optical transmitting devices 313*a* and the second optical transmitting devices 313*b* may be misaligned. Furthermore, light outputting directions of the first optical transmitting devices 313*a* and the second optical transmitting devices 313*b* may be the same or different. Therefore, more optical transmitting devices can be arranged and received in the optical transceiver module for transmitting higher speed signals.

As shown in FIGS. 37A and 37B, the first optical transmitting devices 313*a* and the second optical transmitting devices 313*b* may be misaligned along a short axis DS of the substrate. Furthermore, a shown in FIGS. 37A and 37B, the first optical transmitting devices 313*a* and the second optical transmitting devices 313*b* can be arranged to form a saw-toothed shape.

Referring to FIGS. 38 and 39, the first optical transmitting devices 313a and the second optical transmitting devices 313b can be misaligned along a first direction D1, and the first direction D1 is perpendicular to the substrate 111. As shown in FIG. 38, the first optical transmitting devices 313a and the second optical transmitting devices 313b are aligned along the short axis DS of the substrate 111. As shown in FIG. 39, the first optical transmitting devices 313a and the second optical transmitting devices 313b are aligned along a long axis DL of the substrate 111.

Various aspects of the illustrative implementations are described herein using terms commonly employed by those skilled in the art to convey the substance of their work to others skilled in the art. It will be apparent to those skilled in the art, however, that embodiments of the present invention can be practiced with only some of the described aspects. For purposes of explanation, specific numbers, materials and configurations are set forth in order to provide a thorough understanding of the illustrative implementations. It will be apparent to one skilled in the art, however, that embodiments of the present invention can be practiced without the specific details. In other instances, well-known features are omitted or simplified in order not to obscure the illustrative implementations.

Flow diagrams illustrated herein provide examples of sequences of various process actions which can be performed by processing logic that can include hardware, software, or a combination thereof. Furthermore, various operations are described as multiple discrete operations, in turn, in a manner that is most helpful in understanding the illustrative embodiments; however, the order of description should not be construed as to imply that these operations are necessarily order dependent. Thus, the illustrated implementations should be understood only as examples, and the processes can be performed in a different order, and some actions can be performed in parallel, unless otherwise specified.

Moreover, methods within the scope of this disclosure can include more or fewer steps than those described.

The phrases "in some embodiments" and "in varied embodiments" are used repeatedly. These phrases generally do not refer to the same embodiments; however, they can. The terms "comprising", "having", and "including" are synonymous, unless the context dictates otherwise.

Although various example methods, apparatuses, and systems have been described herein, the scope of coverage of the present disclosure is not limited thereto. On the contrary, the present disclosure covers all methods, apparatus, systems, and articles of manufacture fairly falling within the scope of the appended claims, which are to be construed in accordance with established doctrines of claim interpretation. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

The present invention has been described with preferred embodiments thereof, and it is understood that many changes and modifications to the described embodiments can be carried out without departing from the scope and the spirit of the invention that is intended to be limited only by the appended claims.

The invention claimed is:

1. An optical transceiver module, comprising:
a housing;
a substrate disposed in the housing;
at least one optical receiving device disposed on the substrate; and
a plurality of optical transmitting devices connected to the substrate, wherein the optical transmitting devices are arranged in an alternating manner;
wherein further comprising at least one connecting board, the at least one connecting board comprises a first connecting board and a second connecting board, and the first connecting board and the second connecting board have different lengths.

2. The optical transceiver module according to claim 1, further comprising at least one holder configured to position and arrange the optical transmitting devices.

3. The optical transceiver module according to claim 2, wherein holder comprises a first holder and a second holder for holding the plurality of optical transmitting devices.

4. The optical transceiver module according to claim 3, wherein the first holder is disposed on an upper housing, and the second holder is disposed on a lower housing.

5. The optical transceiver module according to claim 2, wherein the holder comprises at least one holding recess, and a shape of the holding recess is corresponding to a shape of the optical transmitting devices.

6. The optical transceiver module according to claim 1, wherein the plurality of optical transmitting devices are arranged interlaced back and forth in the alternating manner.

7. The optical transceiver module according to claim 1, wherein the optical transmitting devices are connected to the substrate through the connecting board.

8. The optical transceiver module according to claim 1, wherein the optical transmitting devices are positioned on an upper side and a lower side of the substrate, respectively, and arranged in the alternating manner.

9. The optical transceiver module according to claim 1, wherein the substrate comprises at least one convex portion and at least one recess portion, and the at least one recess portion is positioned to at least one side of the convex portion, and the optical transmitting devices are arranged in the recess portion of the substrate.

10. The optical transceiver module according to claim 1, wherein there is an angle between light outputting directions of the plurality of optical transmitting devices, and the angle may be in a range of 90 degrees to 180 degrees.

11. The optical transceiver module according to claim 1, wherein the plurality of optical transmitting devices comprise a plurality of first optical transmitting devices and a plurality of second optical transmitting devices, and the first optical transmitting devices and the second optical transmitting devices are misaligned.

12. The optical transceiver module according to claim 11, wherein light outputting directions of the first optical transmitting devices and the second optical transmitting devices are the same.

13. The optical transceiver module according to claim 11, wherein the first optical transmitting devices and the second optical transmitting devices are misaligned along a first direction, and the first direction is perpendicular to the substrate.

14. The optical transceiver module according to claim 11, wherein the first optical transmitting devices and the second optical transmitting devices are arranged to form a sawtoothed shape.

15. The optical transceiver module according to claim 14, wherein the first optical transmitting devices and the second optical transmitting devices are aligned along a long axis of the substrate.

16. The optical transceiver module according to claim 14, wherein the first optical transmitting devices and the second optical transmitting devices are aligned along a short axis of the substrate.

17. The optical transceiver module according to claim 1, wherein the optical transmitting devices and the at least one optical receiving device are disposed at different sides of the substrate.

18. The optical transceiver module according to claim 11, wherein the first optical transmitting devices and the second optical transmitting devices are misaligned along a short axis of the substrate.

19. An optical cable module, comprising:
an optical fiber cable;
an optical transceiver module, comprising:
a housing;
a substrate disposed in the housing;
at least one optical receiving device disposed on the substrate; and
a plurality of optical transmitting devices connected to the substrate, wherein the optical transmitting devices are arranged in an alternating manner;
wherein further comprising at least one connecting board, the at least one connecting board comprises a first connecting board and a second connecting board, and the first connecting board and the second connecting board have different lengths.

* * * * *